US012724680B2

(12) United States Patent
Shindo

(10) Patent No.: US 12,724,680 B2
(45) Date of Patent: Sep. 1, 2026

(54) SEMICONDUCTOR MEMORY DEVICE AND CONTROL METHOD OF SEMICONDUCTOR MEMORY DEVICE

(71) Applicant: Kioxia Corporation, Tokyo (JP)

(72) Inventor: Yoshihiko Shindo, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 259 days.

(21) Appl. No.: 18/590,795

(22) Filed: Feb. 28, 2024

(65) Prior Publication Data

US 2024/0320109 A1 Sep. 26, 2024

(30) Foreign Application Priority Data

Mar. 24, 2023 (JP) ................................ 2023-047685

(51) Int. Cl.
*G06F 11/16* (2006.01)
*G06F 11/07* (2006.01)
*G06F 11/10* (2006.01)

(52) U.S. Cl.
CPC ...... *G06F 11/1658* (2013.01); *G06F 11/0772* (2013.01); *G06F 11/1016* (2013.01)

(58) Field of Classification Search
CPC ............. G06F 11/1658; G06F 11/0772; G06F 11/1016; G06F 11/1048
USPC .......................................................... 714/764
See application file for complete search history.

(56) References Cited

U.S. PATENT DOCUMENTS 7,159,141 B2 1/2007 Lakhani et al.
7,257,763 B1 * 8/2007 Srinivasan .......... G06F 11/1064 714/764
7,539,896 B2 5/2009 Lakhani et al.
7,962,784 B2 6/2011 Lakhani et al.
2004/0003315 A1 1/2004 Lakhani et al.
2010/0223531 A1 * 9/2010 Fukutomi ............ G06F 11/108 714/764
2015/0261603 A1 * 9/2015 Yaegashi ............ G06F 11/1012 714/764

* cited by examiner

*Primary Examiner* — Albert Decady
*Assistant Examiner* — Enam Ahmed
(74) *Attorney, Agent, or Firm* — Kim & Stewart LLP

(57) ABSTRACT

A semiconductor memory device having first and second physical planes each including a plurality of physical blocks of memory cells, includes a first register in which a first address is to be stored, a second register in which a second address associated with the first address is to be stored, a third register in which third addresses are to be stored, and an address registration unit including a first circuit configured to compare the first address stored in the first register with the third addresses and store the first address in the second register as the second address if the first address does not match any of the third addresses, and a second circuit configured to convert the first address into another address that is stored in the second register as the second address when the first address matches one of the third addresses.

18 Claims, 14 Drawing Sheets

2
SEMICONDUCTOR MEMORY DEVICE
/CE
/RB
CLE
ALE
/WE
/RE
RE
/WP
DQ<7:0>
DQS
/DQS
1
16
12
PROCESSOR
11
RAM
15
MEMORY INTERFACE
14
ECC CIRCUIT
13
HOST INTERFACE
MEMORY CONTROLLER
HOST

110
BLK
BLK
130
130B
130A
130B
130A
ROW DECODER
BLOCK DECODER
BLKSEL
TR_SG3
TR_SG0
TR_CG7
TR_CG0
TR_SG4
SWITCH CIRCUIT GROUP
SGD3: SELECT GATE LINE
SGD0: SELECT GATE LINE
WL7: WORD LINE
WL0: WORD LINE
SGS: SELECT GATE LINE
SG3: SIGNAL LINE
SG0: SIGNAL LINE
CG7: SIGNAL LINE
CG0: SIGNAL LINE
SG4: SIGNAL LINE
VOLTAGE GENERATION CIRCUIT
SEQUENCER
41
43
43A
43A
43B
43B
43A

FIG. 7

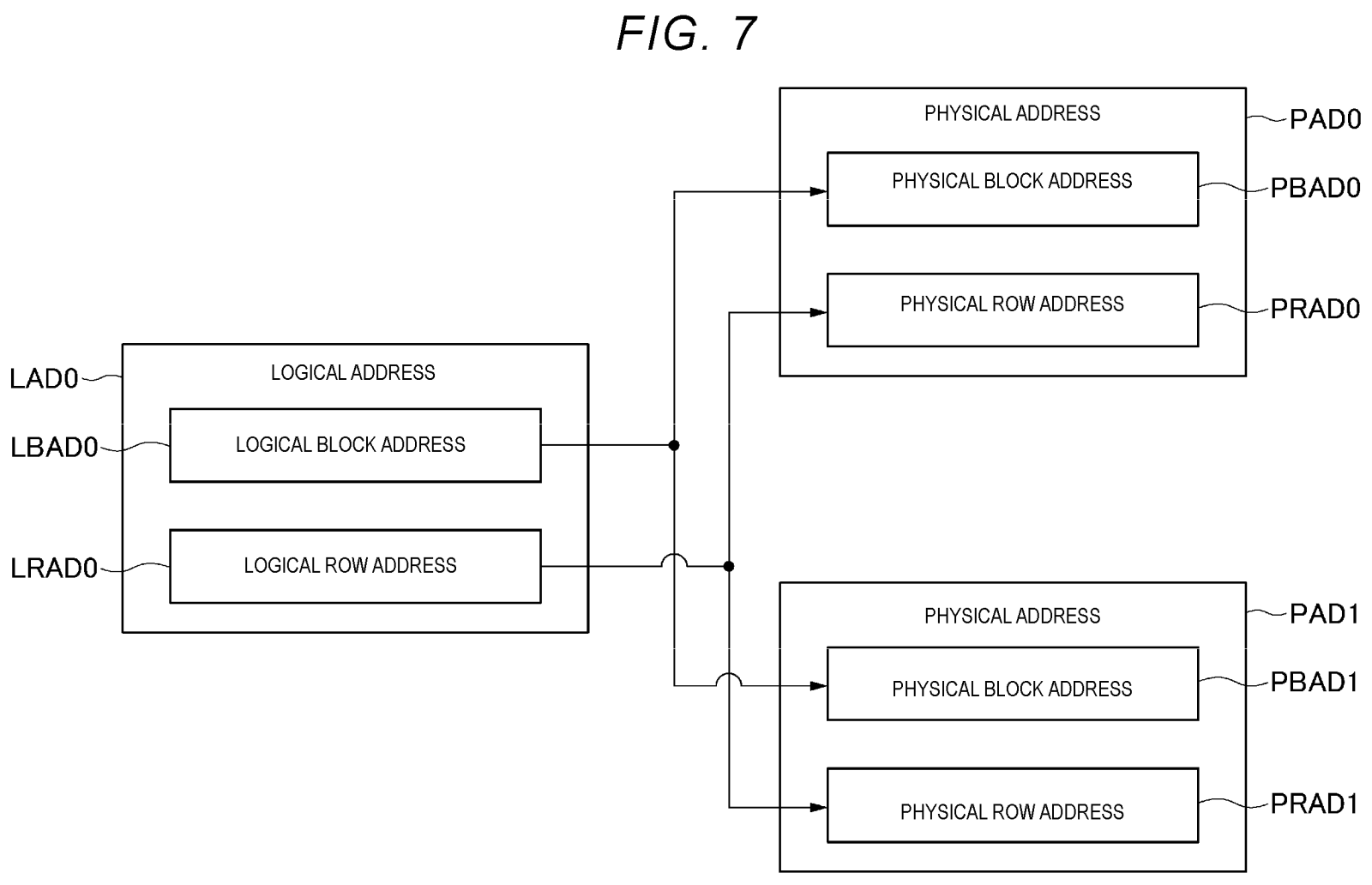

PAD0
PBAD0
PRAD0
PHYSICAL ADDRESS
PHYSICAL BLOCK ADDRESS
PHYSICAL ROW ADDRESS

PAD1
PBAD1
PRAD1
PHYSICAL ADDRESS
PHYSICAL BLOCK ADDRESS
PHYSICAL ROW ADDRESS

LOGICAL ADDRESS
LOGICAL BLOCK ADDRESS
LOGICAL ROW ADDRESS
LAD0
LBAD0
LRAD0

LOGICAL BLOCK ADDRESS LBAD0
(LOGICAL PLANE LPL0)
PHYSICAL BLOCK ADDRESS PBAD0
(PHYSICAL PLANE PPL0)
PHYSICAL BLOCK ADDRESS PBAD1
(PHYSICAL PLANE PPL1)
BLK(0)
BLK(1)
BLK(2)
BLK(3)
BLK(4)
: NORMAL BLOCK
: DEFECTIVE BLOCK

LOGICAL BLOCK ADDRESS LBAD0
(LOGICAL PLANE LPL0)
PHYSICAL BLOCK ADDRESS PBAD0
(PHYSICAL PLANE PPL0)
PHYSICAL BLOCK ADDRESS PBAD1
(PHYSICAL PLANE PPL1)
BLK(0)
BLK(1)
BLK(2)
BLK(3)
BLK(4)
: NORMAL BLOCK
: DEFECTIVE BLOCK
: BLOCK IS NORMAL BLOCK BUT IS REGARDED AS DEFECTIVE BLOCK

LOGICAL BLOCK ADDRESS LBAD0 (LOGICAL PLANE LPL0)
BLK (0)
BLK (1)
BLK (2)
BLK (3)
BLK (4)
BLK (5)
BLK (6)
BLK (7)
BLK (8)
BLK (9)
BLK (10)
BLK (11)
PHYSICAL BLOCK ADDRESS PBAD0 (PHYSICAL PLANE PPL0)
BLK (0)
BLK (1)
BLK (2)
BLK (3)
BLK (4)
BLK (5)
BLK (6)
BLK (7)
BLK (8)
BLK (9)
BLK (10)
BLK (11)
PHYSICAL BLOCK ADDRESS PBAD1 (PHYSICAL PLANE PPL1)
BLK (0)
BLK (1)
BLK (2)
BLK (3)
BLK (4)
BLK (5)
BLK (6)
BLK (7)
BLK (8)
BLK (9)
BLK (10)
BLK (11)
: NORMAL BLOCK
: DEFECTIVE BLOCK

FIG. 13

SEMICONDUCTOR MEMORY DEVICE AND CONTROL METHOD OF SEMICONDUCTOR MEMORY DEVICE

CROSS-REFERENCE TO RELATED APPLICATION(S)

This application is based upon and claims the benefit of priority from Japanese Patent Application No. 2023-047685, filed Mar. 24, 2023, the entire contents of which are incorporated herein by reference.

FIELD

Embodiments described herein relate generally to a semiconductor memory device and a control method of a semiconductor memory device.

BACKGROUND

In the semiconductor memory device, a normal memory area and a redundant memory area are usually provided, and an address of a defective block in the normal memory area is replaced with an address of a normal block in the redundant memory area.

DESCRIPTION OF THE DRAWINGS

FIG. 7 is a block diagram showing an example of a setting method of a physical address from a logical address.

FIG. 13 is a flowchart showing an operation example of the semiconductor memory device according to the embodiment.

DETAILED DESCRIPTION

Figure 1:
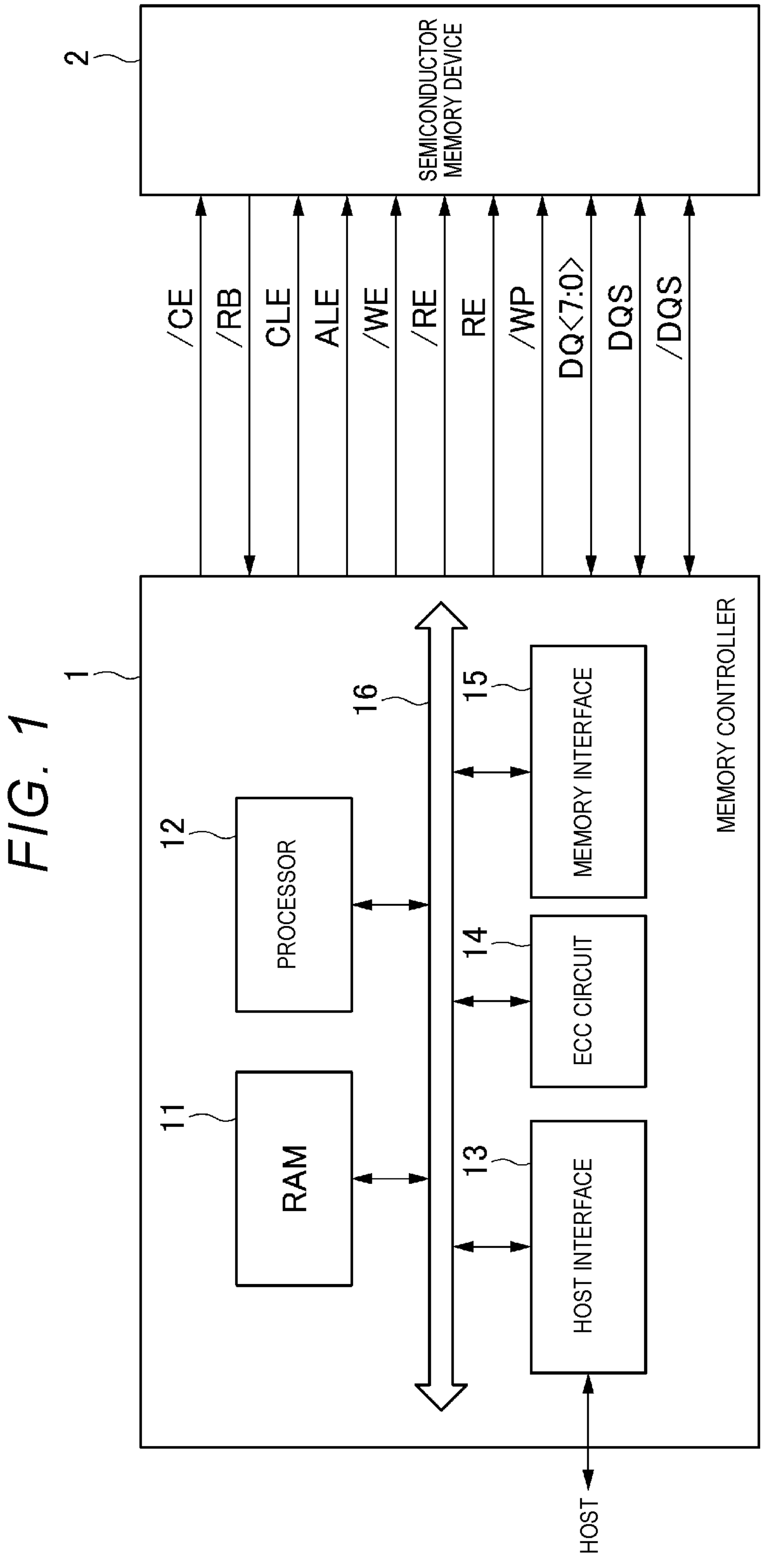
FIG. 1 is a block diagram showing a schematic configuration of a memory system according to an embodiment.

Embodiments provide a semiconductor memory device and a control method of a semiconductor memory device which can increase the number of valid blocks.

In general, according to one embodiment, a semiconductor memory device is a semiconductor memory device that has a plurality of physical planes each including a plurality of physical blocks of memory cells. The semiconductor memory device includes a first register in which a first physical block address is to be stored, a second register in which a second physical block address associated with the first physical block address is to be stored, a third register in which one or more third physical block addresses are to be stored, and an address registration unit including a first circuit configured to compare the first physical block address stored in the first register with the third physical block addresses stored in the third register and store the first physical block address in the second register as the second physical block address if the first physical block address does not match any of the third physical block addresses, and a second circuit configured to convert the first physical block address into another physical block address that is stored in the second register as the second physical block address when the first physical block address matches one of the third physical block addresses.

In general, according to one embodiment, a control method for a semiconductor memory device having first and second physical planes each including a plurality of physical blocks of memory cells, a first register in which a first physical block address is to be stored, and a second register in which a second physical block address associated with the first physical block address is to be stored, includes storing a logical block address as the first physical block address in the first register, comparing the first physical block address stored in the first register with third physical block addresses associated with defective physical blocks in the second physical plane, and storing in the second register, the first physical block address as the second physical address or one of fourth physical block addresses associated with defective physical blocks in the first physical plane as the second physical address, depending on whether or not the first physical block address matches any of the third physical block addresses.

1 Embodiment

Hereinafter, a semiconductor memory device and a control method of a semiconductor memory device according to an embodiment will be described with reference to the drawings. In the present embodiment, as a semiconductor memory device, a three-dimensional stacked NAND flash memory in which memory cell transistors are stacked on a semiconductor substrate will be described as an example. In order to facilitate understanding of the description, the same elements will be denoted by the same reference numerals as much as possible in each drawing, and the description thereof will not be repeated.

1.1 Configuration of Memory System

As shown in FIG. 1, a memory system according to the present embodiment includes a memory controller 1 and a semiconductor memory device 2. The memory system can be connected to a host. The host is, for example, an electronic device, such as a personal computer or a mobile terminal. It should be noted that only one semiconductor memory device 2 is shown in FIG. 1, but a plurality of semiconductor memory devices 2 may be provided in a real memory system.

The memory controller 1 controls writing of data to the semiconductor memory device 2 in response to a write request from the host. Further, the memory controller 1 controls reading of data from the semiconductor memory device 2 in response to a read request from the host.

Between the memory controller 1 and the semiconductor memory device 2, signals including a chip enable signal /CE, a ready busy signal /RB, a command latch enable signal CLE, an address latch enable signal ALE, a write enable signal /WE, read enable signals RE and /RE, a write protect signal /WP, a data signal DQ<7:0>, data strobe signals DQS and /DQS are communicated.

The chip enable signal /CE is a signal for enabling the semiconductor memory device 2. The ready busy signal /RB is a signal for indicating whether the semiconductor memory device 2 is in a ready state or a busy state. The "ready state" is a state in which an external instruction can be received. The "busy state" is a state in which the external instruction cannot be received. The command latch enable signal CLE is a signal indicating that the signal DQ<7:0> is a command. The address latch enable signal ALE is a signal indicating that the signal DQ<7:0> is an address. The write enable signal /WE is a signal for fetching the received signal in the semiconductor memory device 2, and is asserted each time the memory controller 1 receives the command, the address, and the data. The memory controller 1 instructs the semiconductor memory device 2 to fetch the signal DQ<7:0> while the signal /WE is at a "Low (L)" level.

The read enable signals RE and /RE are signals for the memory controller 1 to read the data from the semiconductor memory device 2. The read enable signals RE and /RE are used, for example, to control an operation timing of the semiconductor memory device 2 when the signal DQ<7:0> is output. The write protect signal /WP is a signal for instructing the semiconductor memory device 2 to inhibit data write and erase. The signal DQ<7:0> is, for example, a signal of 8 bits, and contains data communicated between the semiconductor memory device 2 and the memory controller 1. The signal DQ<7:0> includes the command, the address, the data, and the like. The data strobe signals DQS and /DQS are signals for controlling an input/output timing of the signal DQ<7:0>.

The memory controller 1 includes a RAM 11, a processor 12, a host interface 13, an ECC circuit 14, and a memory interface 15. These components are connected to each other by an internal bus 16.

The host interface 13 outputs the requests received from the host, user data (e.g., write data), and the like to the internal bus 16. Further, the host interface 13 transmits the user data read from the semiconductor memory device 2, a response from the processor 12, and the like to the host.

The memory interface 15 controls a process of writing the user data and the like into the semiconductor memory device 2 and a process of reading the user data from the semiconductor memory device 2, based on instructions of the processor 12.

The processor 12 controls the memory controller 1 in an integrated manner. The processor 12 is a CPU, an MPU, or the like. When the request is received from the host via the host interface 13, the processor 12 performs control in response to the request. For example, the processor 12 instructs the memory interface 15 to write the user data and a parity into the semiconductor memory device 2 in response to the request from the host. Further, the processor 12 instructs the memory interface 15 to read the user data and the parity from the semiconductor memory device 2 in response to the request from the host.

The processor 12 determines a storage area (memory area) on the semiconductor memory device 2 with respect to the user data stored in the RAM 11. The user data is stored in the RAM 11 via the internal bus 16. The processor 12 determines the memory area with respect to data in a unit of page (page data), which is a unit of writing. The user data, which is stored in one page of the semiconductor memory device 2, will be also referred to as "unit data" in the following description. The unit data is generally encoded and is stored in the semiconductor memory device 2 as a code word. The encoding is optional in the present embodiment. The memory controller 1 may store the unit data in the semiconductor memory device 2 without encoding, and FIG. 1 shows a configuration in which the encoding is performed, as an example. When the memory controller 1 does not perform the encoding, the page data matches the unit data. Further, one code word may be generated based on one unit data, or one code word may be generated based on divided data obtained by dividing the unit data. Also, one code word may be generated by using a plurality of unit data.

The processor 12 determines the memory area of the semiconductor memory device 2, which is a write destination, for each unit data. For example, the processor 12 issues a write command in response to a write instruction received from the host, and transmits the issued write command to the memory interface 15. A similar operation is performed for a read instruction and an erasing instruction.

The ECC circuit 14 encodes the user data stored in the RAM 11 to generate the code word. Further, the ECC circuit 14 decodes the code word read from the semiconductor memory device 2.

The RAM 11 temporarily stores the user data received from the host until the user data is stored in the semiconductor memory device 2, or temporarily stores the data read from the semiconductor memory device 2 until the user data is transmitted to the host. The RAM 11 is a general-purpose memory, such as an SRAM or a DRAM.

FIG. 1 shows a configuration example in which the memory controller 1 includes the ECC circuit 14 and the memory interface 15. Alternatively, the ECC circuit 14 may be built in the memory interface 15. Further, the ECC circuit 14 may be built in the semiconductor memory device 2. A specific configuration or arrangement of each element shown in FIG. 1 is not particularly limited to the one described herein.

When the write request is received from the host, the memory system in FIG. 1 operates as follows. The processor 12 temporarily stores the data to be written, in the RAM 11. The processor 12 reads the data stored in the RAM 11 and inputs the read data to the ECC circuit 14. The ECC circuit 14 encodes the input data and inputs the code word as the write data to the memory interface 15. The memory interface 15 transfers the signal DQ<7:0> including the write data, the write command issued by the processor 12, and a logical address to the semiconductor memory device 2. The logical address is given to data for which access (read operation, write operation, erasing operation, and the like) is requested from the host.

When the read request is received from the host, the memory system in FIG. 1 operates as follows. First, the memory interface 15 transfers the signal DQ<7:0> including a read command issued by the processor 12 and the logical address to the semiconductor memory device 2. Accordingly, the code word is transferred from the semiconductor memory device 2 to the memory controller 1 as read data. The memory interface 15 inputs the code word read from the semiconductor memory device 2 to the ECC circuit 14. The ECC circuit 14 decodes the input code word and stores the decoded data in the RAM 11. The processor 12 transmits the data stored in the RAM 11 to the host via the host interface 13.

1.2 Schematic Configuration of Semiconductor Memory Device

Figure 2:
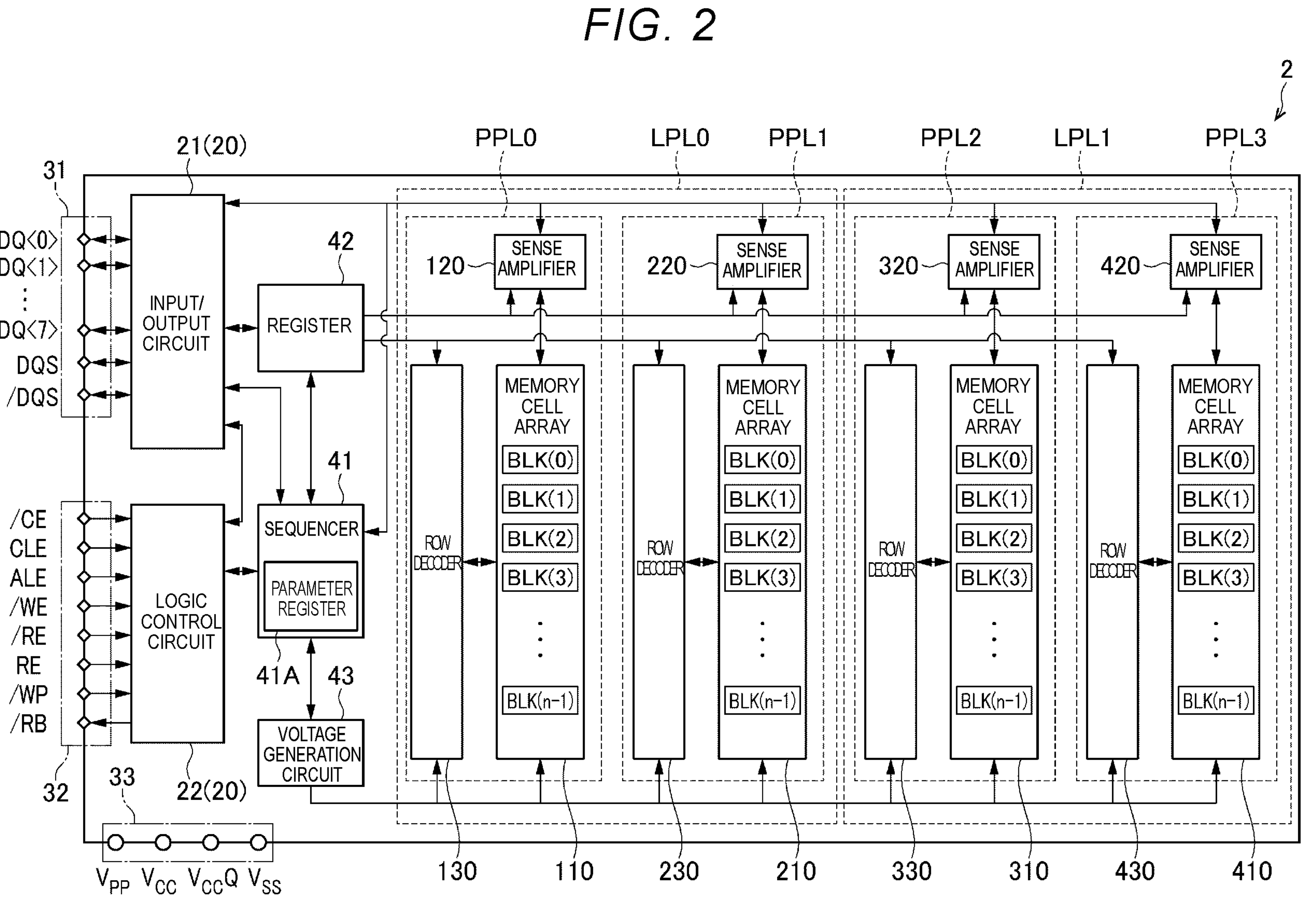
FIG. 2 is a block diagram showing a schematic configuration of a semiconductor memory device according to the embodiment.

FIG. 2 is a block diagram showing the configuration of the semiconductor memory device 2. As shown in FIG. 2, the semiconductor memory device 2 includes four physical planes PPL0, PPL1, PPL2, and PPL3, an input/output circuit 21, a logic control circuit 22, a sequencer 41, a register 42, a voltage generation circuit 43, an input/output pad group 31, a logic control pad group 32, and a power input terminal group 33.

The physical plane PPL0 includes a memory cell array 110, a sense amplifier 120, and a row decoder 130. Similarly, the other physical planes PPL1 to PPL3 also include memory cell arrays 210, 310, and 410, sense amplifiers 220, 320, and 420, and row decoders 230, 330, and 430, respectively. The physical planes PPL0 to PPL3 have the same configuration. That is, the configurations of the memory cell arrays 110, 210, 310, and 410 are the same the configurations of the sense amplifiers 120, 220, 320, and 420 are the same, and the configurations of the row decoders 130, 230, 330, and 430 are the same.

The memory cell arrays 110, 210, 310, and 410 are sections that store data. Each of the memory cell arrays 110, 210, 310, and 410 includes a plurality of memory cell transistors correlated with word lines and bit lines. Each of the physical planes PPL0 to PPL3 has a plurality of physical blocks. Each physical block functions as a unit of an erasing operation.

In the semiconductor memory device 2 according to the present embodiment, one logical plane LPL0 is constructed with the physical plane PPL0 and the physical plane PPL1. Further, one logical plane LPL1 is constructed with the physical plane PPL2 and the physical plane PPL3. Therefore, the memory capacity of the logical plane LPL0 is equal to the sum of the memory capacity of the physical plane PPL0 and the memory capacity of the physical plane PPL1. Further, the memory capacity of the logical plane LPL1 is equal to the sum of the memory capacity of the physical plane PPL2 and the memory capacity of the physical plane PPL3. When the host and the memory controller 1 instruct the semiconductor memory device 2 to perform the write operation, the read operation, the erasing operation, or the like, in the logical plane LPL0 that designates any of the logical planes LPL0 and LPL1, the physical plane PPL0 corresponds to a first physical plane, and the physical plane PPL1 corresponds to a second physical plane. In addition, in the logical plane LPL1, the physical plane PPL2 corresponds to a first physical plane, and the physical plane PPL3 corresponds to a second physical plane.

The semiconductor memory device 2 receives the write instruction or the read instruction to the logical plane LPL0 from the memory controller 1, and executes the write operation or the read operation by using the two physical planes PPL0 and PPL1.

For example, when the semiconductor memory device 2 receives the write instruction of data having a data length of 2X (X is any integer) with respect to the logical plane LPL0 from the memory controller 1, the semiconductor memory device 2 divides the data into two parts and writes data having a data length of X to each of the two physical planes PPL0 and PPL1. For example, when the semiconductor memory device 2 receives the write instruction for 16 KB of data with respect to the logical plane LPL0 from the memory controller 1, the physical plane PPL0 and the physical plane PPL1 both perform the write operation, so that 8 KB of data is written to one of the physical blocks BLK provided in the memory cell array 110 of the physical plane PPL0 and 8 KB of data is written to one of the physical blocks BLK provided in the memory cell array 210 of the physical plane PPL1.

Similarly, when the semiconductor memory device 2 receives the read instruction from the memory controller 1 with respect to the logical plane LPL0, the semiconductor memory device 2 reads the data having the data length X from the two physical planes PPL0 and PPL1, respectively, combines the data, and transmits the combined data as the read data having the data length 2X to the memory controller 1. For example, when the semiconductor memory device 2 receives the read instruction for 16 KB of data with respect to the logical plane LPL0 from the memory controller 1, the physical plane PPL0 and the physical plane PPL1 both perform the read operation, so that 8 KB of data is read from one of the physical blocks BLK provided in the memory cell array 110 of the physical plane PPL0 and 8 KB of data is read from one of the physical blocks BLK provided in the memory cell array 210 of the physical plane PPL1.

When the semiconductor memory device 2 receives the write instruction or the read instruction with respect to the logical plane LPL1 from the memory controller 1, the semiconductor memory device 2 similarly executes the writing and the reading of the data with respect to the two physical planes PPL2 and PPL3.

By providing the two physical planes having unit data length of X and operating the two physical planes as one logical plane having unit data length of 2X by combining the two physical planes, the write operation and the read operation can be speeded up by using the semiconductor memory device 2 as compared with when the physical plane having unit data length of 2X is provided.

The input/output circuit 21 communicates the signal DQ<7:0> and the data strobe signals DQS and /DQS to and from the memory controller 1. The input/output circuit 21 transfers the command and the logical address in the signal DQ<7:0> to the register 42. The input/output circuit 21 also communicates the write data and the read data to and from the sense amplifiers 120, 220, 320, and 420.

The logic control circuit 22 receives, from the memory controller 1, the chip enable signal /CE, the command latch enable signal CLE, the address latch enable signal ALE, the write enable signal /WE, the read enable signals RE and /RE, and the write protect signal /WP. Further, the logic control circuit 22 transfers the ready busy signal /RB to the memory controller 1 to notify the outside of the state of the semiconductor memory device 2.

Both the input/output circuit 21 and the logic control circuit 22 are circuits where the signals are input and output to and from the memory controller 1. Hereinafter, the input/output circuit 21 and the logic control circuit 22 will be collectively referred to as an “interface circuit 20”. The interface circuit 20 is a circuit to and from which signals including a control signal related to the operations of the logical planes LPL0 and LPL1 are input and output. The above-described “control signal” is, for example, the command and the logical address in the signal DQ<7:0> input to the input/output circuit 21, the command latch enable signal CLE input to the logic control circuit 22, or the like.

The sequencer 41 controls the operation of the semiconductor memory device 2, including the logical planes LPL0 and LPL1 and the voltage generation circuit 43, based on the control signal input from the memory controller 1 to the interface circuit 20. The sequencer 41 includes a parameter register 41A. The parameter register 41A stores information read from a ROM block by a power-on read process described later, for example.

Figure 3:
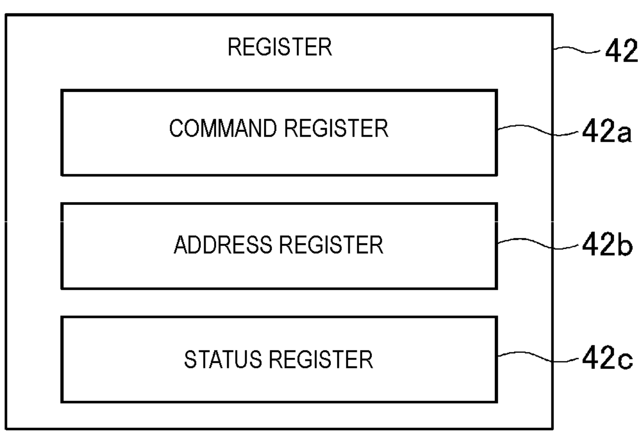
FIG. 3 is a block diagram showing a schematic configuration of a register in the embodiment.

The register 42 temporarily stores the command, the address, or the like. As shown in FIG. 3, the register 42 includes a command register 42*a*, an address register 42*b*, and a status register 42*c*.

The command register 42*a* stores a command for giving an instruction of the write operation, the read operation, the erasing operation, and the like with respect to the logical planes LPL0 and LPL1. The command is input from the memory controller 1 to the input/output circuit 21, and then transferred from the input/output circuit 21 to the command register 42*a* and stored therein. The command register 42*a* transfers the stored command to the sequencer 41.

The address register 42*b* stores the address of each of the physical planes PPL0 and PPL1 corresponding to the command to the logical plane LPL0 and the address of each of the physical planes PPL2 and PPL3 corresponding to the command to the logical plane LPL1. For example, when a logical address LAD0 of the logical plane LPL0 is input from the memory controller 1 to the input/output circuit 21, the logical address LAD0 is transferred from the input/output circuit 21 to the address register 42*b*. The address register 42*b* converts the logical address LAD0 into a physical address PAD0 of the physical plane PPL0 and a physical address PAD1 of the physical plane PPL1, and stores the converted physical addresses PAD0 and PAD1.

The logical address LAD0 includes a logical block address LBAD0 and a logical row address LRAD0 corresponding to the logical plane LPL0. The logical block address LBAD0 is an address for selecting a logical block BLK of the logical plane LPL0. The logical row address LRAD0 is an address for selecting a word line of the logical plane LPL0.

The physical address PAD0 includes a physical block address PBAD0 and a physical row address PRAD0 corresponding to the memory cell array 110 of the physical plane PPL0. The physical block address PBAD0 is an address for selecting a physical block BLK provided in the memory cell array 110 of the physical plane PPL0. The physical row address PRAD0 is an address for selecting a word line WL and a select gate line SGD (any string unit SU) provided in the physical block BLK. In other words, the physical row address PRAD0 is an address for selecting a page (memory cell group MG) provided in the physical block BLK selected by the physical block address PBAD0.

The physical address PAD1 includes a physical block address PBAD1 and a physical row address PRAD1 corresponding to the memory cell array 210 of the physical plane PPL1. The physical block address PBAD1 is an address for selecting a physical block BLK provided in the memory cell array 210 of the physical plane PPL1. The physical row address PRAD1 is an address for selecting a word line WL and a select gate line SGD (any string unit SU) provided in the physical block BLK. In other words, the physical row address PRAD1 is an address for selecting a page (memory cell group MG) provided in the physical block BLK selected by the physical block address PBAD1.

The address register 42*b* transfers the physical block address PBAD0 and the physical row address PRAD0 included in the physical address PAD0 to the row decoder 130 of the physical plane PPL0. The address register 42*b* transfers the physical block address PBAD1 and the physical row address PRAD1 included in the physical address PAD1 to the row decoder 230 of the physical plane PPL1.

When a logical address LAD1 of the logical plane LPL1 is input to the input/output circuit 21 from the memory controller 1, the address register 42*b* similarly converts the logical address LAD1 into a physical address PAD2 of the physical plane PPL2 and a physical address PAD3 of the physical plane PPL3, and stores the converted physical addresses PAD2 and PAD3. In addition, the address register 42*b* transfers a physical block address PBAD2 and a physical row address PRAD2 included in the physical address PAD2 to the row decoder 330 of the physical plane PPL2. Further, the address register 42*b* transfers a physical block address PBAD3 and a physical row address PRAD3 included in the physical address PAD3 to the row decoder 430 of the physical plane PPL3.

The status register 42*c* is a section that stores status information indicating the state of each of the physical planes PPL0 to PPL3. The status information is updated by the sequencer 41 each time in accordance with an operation state of each of the physical planes PPL0 to PPL3. The status information stored in the status register 42*c* is transmitted from the input/output circuit 21 to the memory controller 1 as a state signal in response to the request from the memory controller 1.

The voltage generation circuit 43 shown in FIG. 2 generates voltages required for the write operation, the read operation, and the erasing operation based on the instructions from the sequencer 41, and supplies the generated voltages to the row decoders 130, 230, 330, and 430 and the sense amplifiers 120, 220, 320, and 420.

The sense amplifier 120 is a circuit for adjusting the voltage applied to the bit line of the memory cell array 110 or reading the voltage of the bit line of the memory cell array 110 to convert the read voltage into data. During the reading of the data, the sense amplifier 120 acquires the data read from the memory cell transistors of the memory cell array 110 to the bit line, and transfers the acquired read data to the input/output circuit 21. During writing of the data, the sense amplifier 120 transfers the data written via the bit line to the memory cell transistor of the memory cell array 110.

The row decoder 130 is a circuit for applying the voltages to a plurality of word lines WL and a plurality of select gate lines SGD and SGS in any of the physical blocks BLK provided in the memory cell array 110. The row decoder 130 receives the physical block address PBAD0 and the physical row address PRAD0 corresponding to the physical plane PPL0 from the address register 42*b* of the register 42, selects the physical block of the memory cell array 110 based on the physical block address PBAD0, and selects the word line of the memory cell array 110 based on the physical row address PRAD0. The row decoder 130 switches open and closed states of a switch group so that the voltage from the voltage generation circuit 43 is applied to the selected word line.

Figure 4:
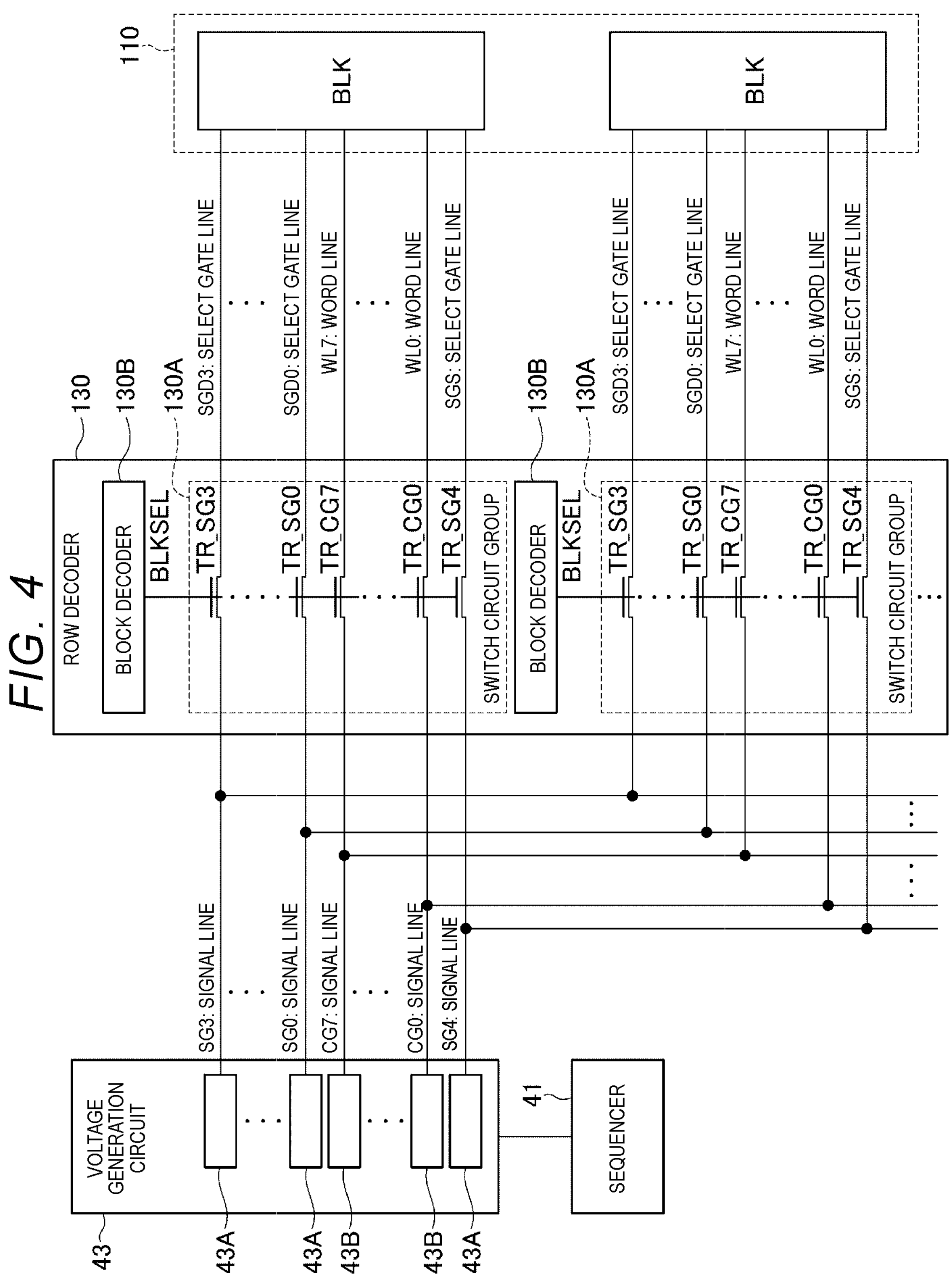
FIG. 4 is a block diagram showing an example of a connection between a row decoder and a memory cell array in the embodiment.

FIG. 4 is a block diagram showing an example of a connection between the row decoder 130 and the memory cell array 110. The voltage generation circuit 43 generates various voltages including voltages required for a program operation, a read operation, and the like with respect to a memory cell transistor MT. The voltage generation circuit 43 includes an SG driver 43A that supplies the voltages to signal lines SG0 to SG4 and a plurality of CG drivers 43B that supply the voltages to signal lines CG0 to CG7. These signal lines SG0 to SG4 and CG0 to CG7 are branched by the row decoder 130 and are connected to a wiring of each physical block BLK. That is, the signal lines SG0 to SG3 function as global select gate lines and are connected to select gate lines SGD0 to SGD3 as local select gate lines in each physical block BLK via the row decoder 130. The signal lines CG0 to CG7 function as global word lines and are connected to word lines WL0 to WL7 as local word lines in each physical block BLK via the row decoder 130. The signal line SG4 functions as a global select gate line and is connected to the select gate line SGS as a local select gate line in each physical block BLK via the row decoder 130.

The voltage generation circuit 43 is controlled by the sequencer 41 to generate various voltages. The SG driver (select gate line driver) 28A and the CG driver (word line driver) 28B supply various generated voltages to the corresponding signal lines SG0 to SG4 and signal lines CG0 to CG7, respectively.

The row decoder 130 has a plurality of switch circuit groups 130A corresponding to each of the physical blocks BLK and a plurality of block decoders 130B corresponding to each of the plurality of switch circuit groups 130A. Each switch circuit group 130A includes a plurality of transistors TR_SG0 to TR_SG4 that connect the signal lines SG0 to SG4 and the select gate lines SGD0 to SGD4 to each other, and a plurality of transistors TR_CG0 to TR_CG7 that connect the signal lines CG0 to CG7 and the word lines WL0 to WL7 to each other. Each of the transistors TR_SG0 to TR_SG4 and the transistors TR_CG0 to TR_CG7 is a high breakdown voltage transistor.

When an address (e.g., physical block address PBAD0 included in the physical address PAD0) is supplied, the corresponding block decoder 130B supplies a block select signal BLKSEL to the gates of the transistors TR_SG0 to TR_SG4 and the transistors TR_CG0 to TR_CG7. As a result, in the switch circuit group 130A corresponding to the address (e.g., physical block address PBAD0 included in the physical address PAD0), the transistors TR_SG0 to TR_SG4 and the transistors TR_CG0 to TR_CG7 are turned on to be conductive. Therefore, the voltages supplied from the voltage generation circuit 43 to the signal lines SG0 to SG4 and the signal lines CG0 to CG7 are supplied to the select gate lines SGD0 to SGD3, and SGS, and the word lines WL0 to WL7 provided in the physical block BLK corresponding to the address (e.g., physical block address PBAD0 included in the physical address PAD0).

The sense amplifiers 220, 320, and 420 perform the operations similar to those of the sense amplifier 120 for each of the memory cell arrays 210, 310, and 410. In addition, the row decoders 230, 330, and 430 perform the similar operations similar to those of the row decoder 130 on each of the memory cell arrays 210, 310, and 410.

The operations of the sense amplifiers 120, 220, 320, and 420 and the row decoders 130, 230, 330, and 430 are controlled by the sequencer 41. The sequencer 41 operates the sense amplifiers 120 and 220 in synchronization with each other, and operates the row decoders 130 and 230 in synchronization with each other, thereby operating the physical plane PPL0 and the physical plane PPL1 as one logical plane LPL0. Similarly, the sequencer 41 operates the sense amplifiers 320 and 420 in synchronization with each other, and operates the row decoders 330 and 430 in synchronization with each other, thereby operating the physical plane PPL2 and the physical plane PPL3 as one logical plane LPL1.

The input/output pad group 31 includes a plurality of terminals (pads) for communicating each signal between the memory controller 1 and the input/output circuit 21. Each terminal is provided individually corresponding to each of the signal DQ<7:0> and the data strobe signals DQS and /DQS.

The logic control pad group 32 includes a plurality of terminals (pads) for communicating each signal between the memory controller 1 and the logic control circuit 22. Each terminal is provided individually corresponding to the chip enable signal /CE, the command latch enable signal CLE, the address latch enable signal ALE, the write enable signal /WE, the read enable signal RE and /RE, the write protect signal /WP, and the ready busy signal /RB.

The power input terminal group 33 includes a plurality of terminals for receiving each voltage to be applied for the operation of the semiconductor memory device 2. The voltages applied to the terminals include power voltages Vcc, VccQ, Vpp, and a ground voltage Vss.

The power voltage Vcc is a circuit power voltage applied from the outside as an operation power, and is, for example, a voltage of about 3.3 V. The power voltage VccQ is, for example, a voltage of 1.2 V. The power voltage VccQ is a voltage used when the signals are communicated between the memory controller 1 and the semiconductor memory device 2. The power voltage Vpp is a power voltage higher than the power voltage Vcc, and for example, is a voltage of 12 V.

At least one of the plurality of physical blocks BLK provided in each of the memory cell arrays 110, 210, 310, and 410 functions as the ROM block. For example, in the semiconductor memory device 2, one of the plurality of physical blocks BLK provided in the memory cell array 110, one of the plurality of physical blocks BLK provided in the memory cell array 210, one of the plurality of physical blocks BLK provided in the memory cell array 310, and one of the plurality of physical blocks BLK provided in the memory cell array 410 may function as the ROM block. The ROM block stores system data required for the operation of the semiconductor memory device 2, for example, various operation parameters, instead of the user data. In addition, the ROM block includes state information (non-defective block/defective block information) indicating whether each of the plurality of physical blocks BLK provided in the memory cell arrays 110, 210, 310, and 410 is in a normal state or a defective state. The user is prohibited from giving an instruction to write the user data to the ROM block or giving an instruction to erase the data stored in the ROM block. In other words, the ROM block is a block in each of the memory cell arrays 110, 210, 310, and 410, that is specially provided as a storage area in which writing, erasing, and the like from the outside are not possible.

In the memory system according to the present embodiment, when the power-on voltage is supplied to the memory system, the semiconductor memory device 2 performs the power-on read process. Specifically, when the power-on voltage is supplied to the memory system, the processor 12 of the memory controller 1 shown in FIG. 1 instructs the semiconductor memory device 2 to execute the power-on read process via the memory interface 15. As a result, in the semiconductor memory device 2, for example, the data is read from the ROM block provided in each of the memory cell arrays 110, 210, 310, and 410, and the data is stored in the parameter register 41A of the sequencer 41.

The operation parameters stored in the ROM block are stored in the parameter register 41A of the sequencer 41 through the power-on read process, so that the semiconductor memory device 2 is in a state in which the semiconductor memory device 2 can be appropriately operated; in other words, the semiconductor memory device 2 is in a state of being started up. Further, the state information (non-defective block/defective block information) of the physical block read from the ROM block is transmitted to the memory controller 1 via the input/output circuit 21 and is stored in the RAM 11 shown in FIG. 1. The memory controller 1 instructs the semiconductor memory device 2 to operate in a way that avoids a defective physical block, based on the state information (non-defective block/defective block information) of the physical block stored in the RAM.

1.3 Configuration of Physical Plane

Next, the configurations of the physical planes PPL0 to PPL3 will be described. It should be noted that, as described above, since the configurations of the physical planes PPL0 to PPL3 are the same as each other, only the configuration of the physical plane PPL0 will be described below, and the configurations of the physical planes PPL1 to PPL3 will not be described and shown.

Figure 5:
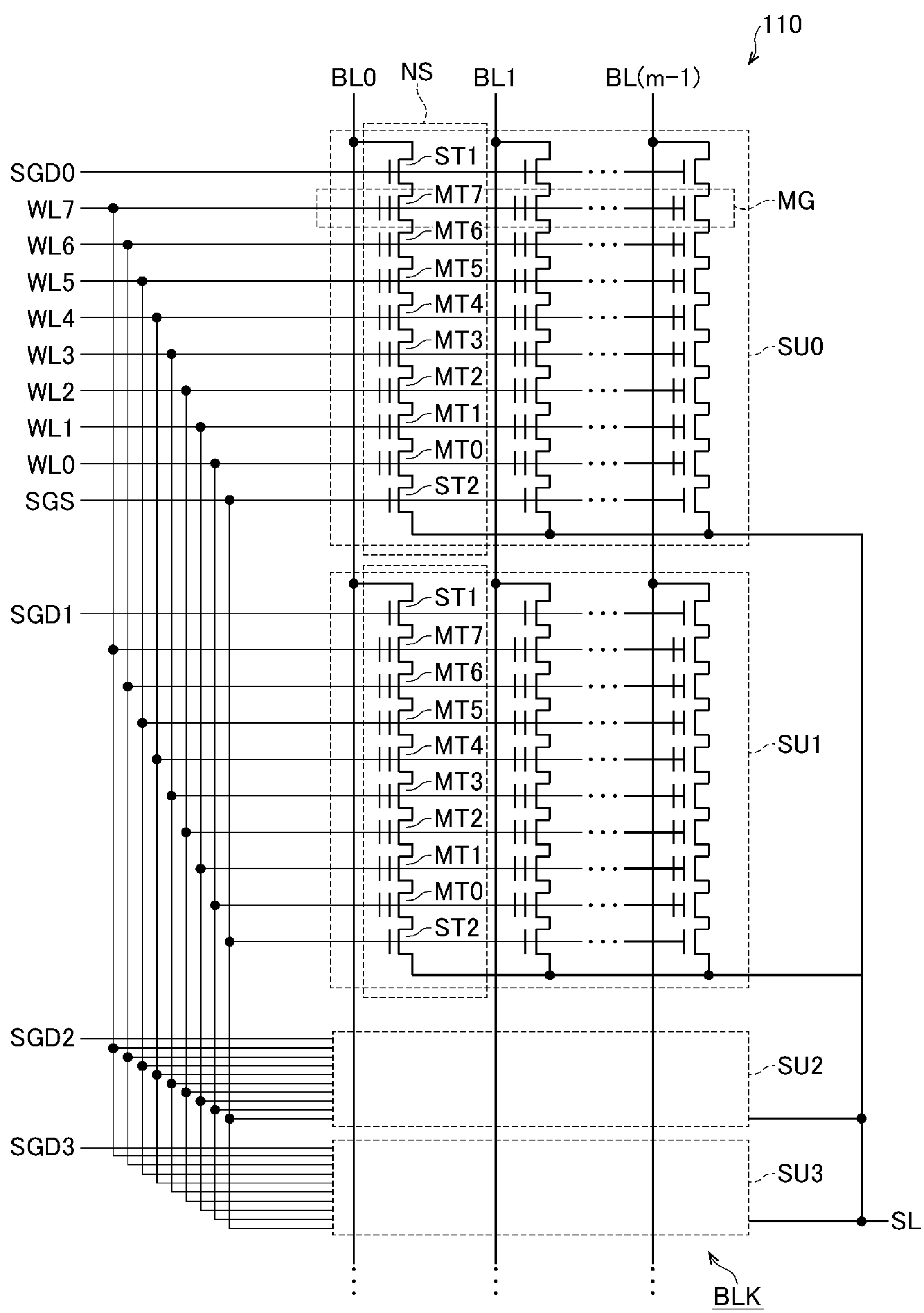
FIG. 5 is a circuit diagram showing a configuration of the semiconductor memory device according to the embodiment.

FIG. 5 is an equivalent circuit showing the configuration of the memory cell array 110 provided in the physical plane PPL0. The memory cell array 110 includes a plurality of physical blocks BLK(0) to BLK(n−1). It should be noted that "n" is an integer representing the number of physical blocks provided in the physical plane PPL0. In FIG. 5, only one physical block BLK of these physical blocks is shown. The configurations of the other physical blocks BLK provided in the memory cell array 110 are also the same as the configuration shown in FIG. 5.

As shown in FIG. 5, the physical block BLK includes, for example, four string units SU (SU0 to SU3). Further, each of the string units SU includes a plurality of NAND strings NS. Each of the NAND strings NS includes, for example, eight memory cell transistors MT (MT0 to MT7), and select transistors ST1 and ST2.

It should be noted that the number of memory cell transistors MT is not limited to eight, and may be, for example, 32, 48, 64, or 96. For example, in order to improve the cutoff characteristics, each of the select transistors ST1 and ST2 may include a plurality of transistors instead of a single transistor. Furthermore, dummy cell transistors may be provided between the memory cell transistors MT and the select transistors ST1 and ST2.

The memory cell transistors MT are disposed and connected in series between the select transistor ST1 and the select transistor ST2. The memory cell transistor MT7 on one end side is connected to a source of the select transistor ST1, and the memory cell transistor MT0 on the other end side is connected to a drain of the select transistor ST2.

Gates of the select transistors ST1 in the string units SU0 to SU3 are commonly connected to the select gate lines SGD0 to SGD3, respectively. The gate of the select transistor ST2 is commonly connected to the same select gate line SGS among the plurality of string units SU in the same physical block BLK. Control gates of the memory cell transistors MT0 to MT7 in the same physical block BLK are commonly connected to the word lines WL0 to WL7, respectively. That is, the word lines WL0 to WL7 and the select gate line SGS are common to the plurality of string units SU0 to SU3 in the same physical block BLK, whereas the select gate line SGD is provided individually for each of the string units SU0 to SU3 even in the same physical block BLK.

The memory cell array 110 is provided with m bit lines BL (BL0, BL1, . . . , BL(m−1)). The above-described "m" is an integer representing the number of NAND strings NS provided in one string unit SU. A drain of the select transistor ST1 in each of the NAND strings NS is connected to the corresponding bit line BL. A source of the select transistor ST2 is connected to a source line SL. The source line SL is commonly connected to the sources of a plurality of select transistors ST2 provided in the physical block BLK.

The data stored in a plurality of memory cell transistors MT in the same physical block BLK are collectively erased. Meanwhile, the reading and writing of data are collectively performed with respect to the plurality of memory cell transistors MT connected to one word line WL and belonging to one string unit SU.

It should be noted that, hereinafter, a group of memory cell transistors MT connected to one word line WL and belonging to one string unit SU will be referred to as the memory cell group MG. In addition, a set of data stored in the memory cell transistors MT belonging to the "memory cell group MG" will be referred to as a "page" of data. In FIG. 5, the memory cell group MG, which includes the memory cell transistors belonging to the string unit SU0 and connected to the word line WL7, is denoted by reference numeral "MG". When each memory cell transistor MT is a single level cell (SLC) which can store 1 bit of information, one memory cell group MG can store data of one page. When each memory cell transistor MT is a multi-level cell (MLC) which can store 2 bits of information, one memory cell group MG can store data of two pages. When each memory cell transistor MT is a three level cell (TLC) which can store 3 bits of information, one memory cell group MG can store data of three pages. When each memory cell transistor MT is a quad level cell (QLC) which can store 4 bits of information, one memory cell group MG can store data of 4 pages.

1.4 Cross-Sectional Structure of Semiconductor Memory Device

Figure 6:
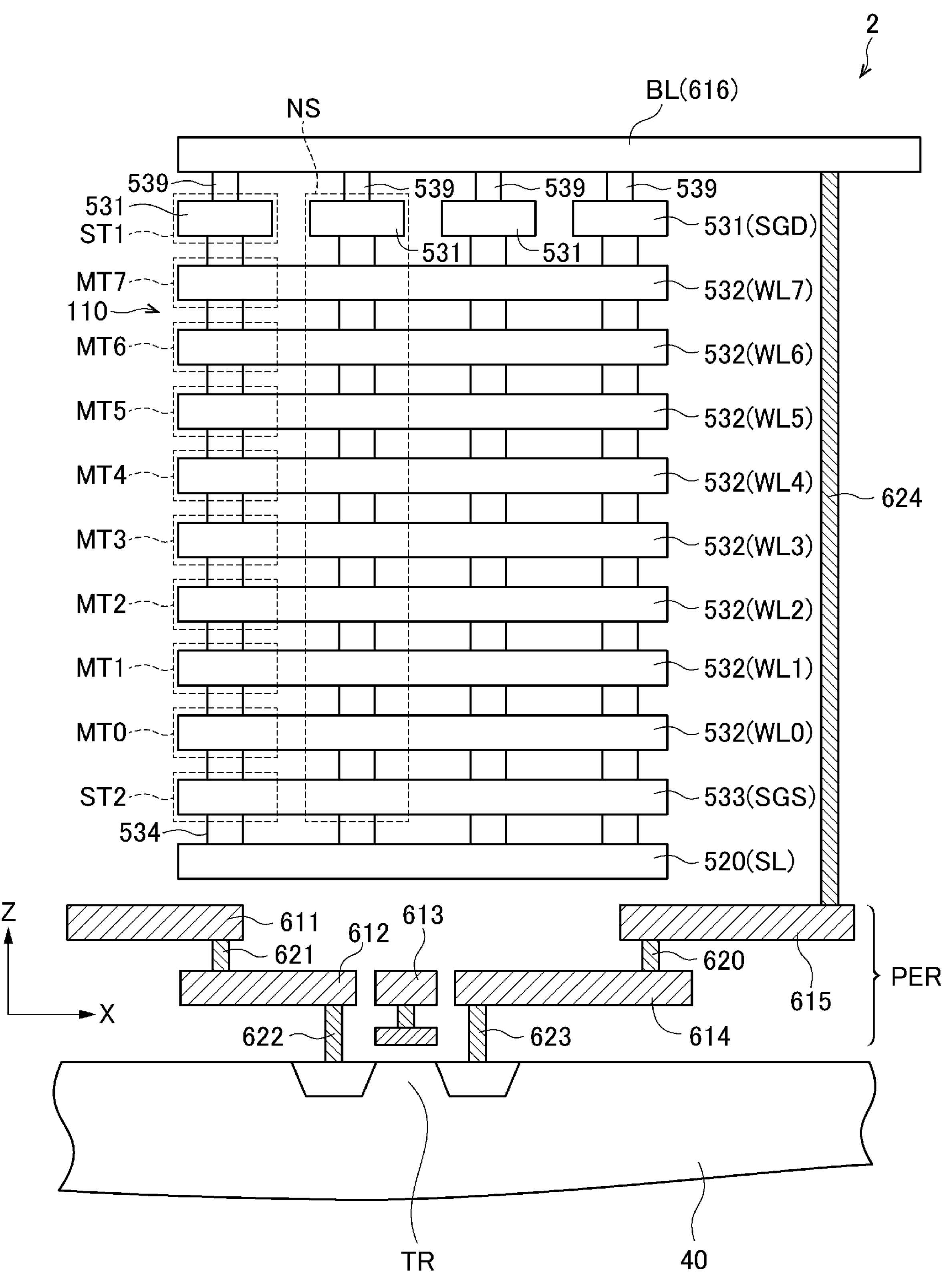
FIG. 6 is a cross-sectional view showing a cross-sectional structure of the semiconductor memory device according to the embodiment.

FIG. 6 shows a cross-sectional structure of the semiconductor memory device 2. As shown in FIG. 6, the semiconductor memory device 2 has a structure in which a peripheral circuit PER and the memory cell array 110 are sequentially disposed on a semiconductor substrate 40.

In the memory cell array 110, the plurality of NAND strings NS are formed on a conductor layer 520. The conductor layer 520 is also called a buried source line (BSL) and corresponds to the source line SL in FIG. 5.

Above the conductor layer 520, a wiring layer 533 that functions as the select gate line SGS, a plurality of wiring layers 532 that function as the word lines WL, and a wiring layer 531 that functions as the select gate line SGD are stacked. An insulating layer (not shown) is disposed between the stacked wiring layers 533, 532, and 531.

A plurality of memory holes 534 are formed in the memory cell array 110. The memory hole 534 is a hole that penetrates the wiring layers 533, 532, and 531 and the insulating layer (not shown) between the wiring layers 533, 532, and 531 in an up-down direction and reaches the conductor layer 520.

Each section of the memory hole 534 that intersects each of the stacked wiring layers 533, 532, and 531 functions as a transistor. Among these plurality of transistors, the transistor in the section intersecting the wiring layer 531 functions as the select transistor ST1. Among the plurality of transistors, the transistors in the sections intersecting the wiring layers 532 function as the memory cell transistors MT0 to MT7. Among the plurality of transistors, the transistor in the section intersecting the wiring layer 533 functions as the select transistor ST2.

A wiring layer 616 that functions as the bit line BL is formed above the memory hole 534. An upper end of the memory hole 534 is connected to the wiring layer 616 via a contact plug 539.

A plurality of structures similar to the structures shown in FIG. 6 are arranged along a depth direction of a paper surface of FIG. 6. One string unit SU is formed by a group that includes the plurality of NAND strings NS arranged in a row along the depth direction of the paper surface in FIG. 6.

The semiconductor substrate 40 and the conductor layer 520 (source line SL) are disposed apart from each other, and a part of the peripheral circuit PER is disposed between the semiconductor substrate 40 and the conductor layer 520. The peripheral circuit PER is a circuit that supports the data write operation, the read operation, the erasing operation, and the like in the memory cell array 110. The sense amplifier 120, the row decoder 130, the voltage generation circuit 43, and the like shown in FIG. 2 are each a part of the peripheral circuit PER.

The peripheral circuit PER includes a transistor TR formed on an upper surface of the semiconductor substrate 40 and a plurality of conductors 611 to 615. The conductors 611 to 615 are wiring layers formed of, for example, conductors such as metal. The conductors 611 to 615 are distributed at a plurality of height positions, and are electrically connected to each other via contacts 620 to 623. The contacts 620 to 623 are formed by forming contact holes so as to penetrate the insulating layer (not shown) in the up-down direction, and then filling the inside of the contact holes with a conductor material such as tungsten. The conductor 615 is electrically connected to the wiring layer 616 (bit line BL) via a contact 624.

1.5 Configuration of Address Register

As described above, in the semiconductor memory device 2 according to the present embodiment, the logical plane LPL0 having unit data length of 2X is constructed with the physical plane PPL0 having unit data length of X and the physical plane PPL1 having unit data length of X, and the logical plane LPL1 having unit data length of 2X is constructed with the physical plane PPL2 having unit data length of X and the physical plane PPL3 having unit data length of X. By providing the two physical planes having unit data length of X and operating the two physical planes as the logical plane having unit data length of 2X by combining the two physical planes, the write operation and the read operation can be speeded up by using the semiconductor memory device 2 as compared with when the physical plane having unit data length of 2X is provided. As shown in FIG. 7, the logical address LAD0 corresponding to the logical plane LPL0 includes the logical block address LBAD0 and the logical row address LRAD0. The logical block address LBAD0 is an address for selecting the logical block BLK of the logical plane LPL0. The logical row address LRAD0 is an address for selecting the word line of the logical plane LPL0.

Figure 8:
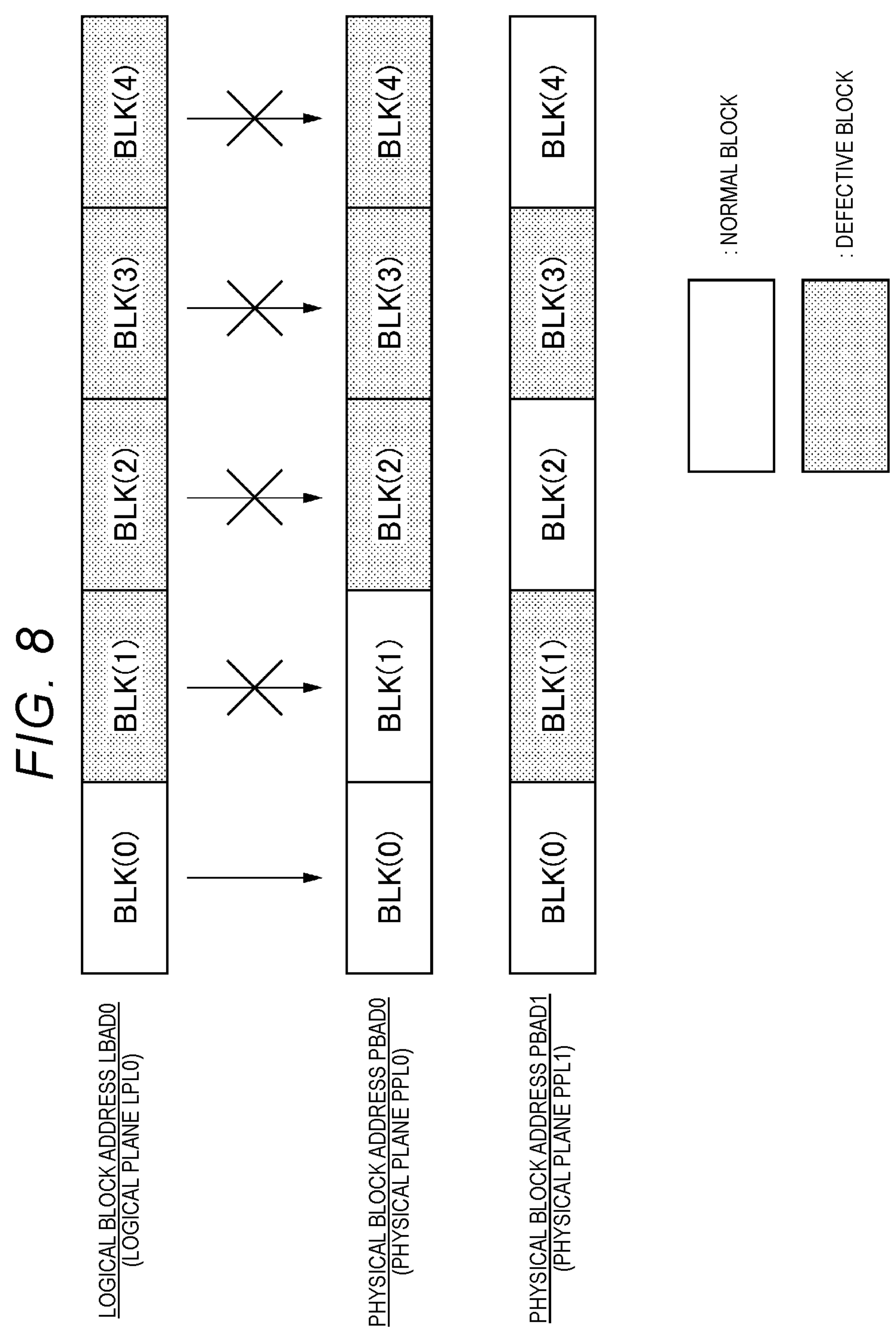
FIG. 8 is a diagram schematically showing a setting example of a logical block address.

FIG. 8 shows a comparative example of a setting method of the physical address PAD0 of the physical plane PPL0 and the physical address PAD1 of the physical plane PPL1 based on the logical address LAD0 in FIG. 8. In the comparative example, the logical block address LBAD0 is used as the physical block addresses PBAD0 and PBAD1 of the physical planes PPL0 and PPL1, and the logical row address LRAD0 is used as the physical row addresses PRAD0 and PRAD1 of the physical planes PPL0 and PPL1.

In a case of the comparative example, for example, when the logical block address LBAD0 is the address of the block BLK(0), the physical block addresses PBAD0 and PBAD1 of the physical planes PPL0 and PPL1 are both set to the address of the block BLK(0). In this case, as in the example shown in FIG. 8, when the physical block BLK(0) of the physical plane PPL0 is a normal block (non-defective block) and the physical block BLK(0) of the physical plane PPL1 is also a normal block (non-defective block), the logical block BLK(0) of the logical plane LPL0 can be constructed as a normal block (non-defective block) by a combination thereof.

Meanwhile, any one of the physical block BLK of the physical plane PPL0 and a corresponding block of the physical plane PPL1 may be a defective block (defective block). For example, when the logical block address LBAD0 is the address of the block BLK(1), the physical block addresses PBAD0 and PBAD1 of the physical planes PPL0 and PPL1 are both set to the address of the block BLK(1). In this case, as in the example shown in FIG. 8, when the physical block BLK(1) of the physical plane PPL0 is a normal block (non-defective block), whereas the physical block BLK(1) of the physical plane PPL1 is a defective block (defective block), the logical block BLK(1) of the logical plane LPL0 constructed with a combination thereof is a defective block (defective block).

Similarly, as in the example shown in FIG. 8, when the physical block BLK(2) of the physical plane PPL0 is a defective block (defective block) and the physical block BLK(2) of the physical plane PPL1 is a normal block (non-defective block), the logical block BLK(2) of the logical plane LPL0 constructed with a combination thereof is also a defective block (defective block).

It should be noted that, as in the example shown in FIG. 8, when the physical block BLK(3) of the physical plane PPL0 and the physical block BLK(3) of the physical plane PPL1 are both defective blocks (defective blocks), the logical block BLK(3) of the logical plane LPL0 constructed with a combination thereof is also a defective block (defective block).

As described above, in the setting method of the comparative example as shown in FIG. 8, when any one of the physical block BLK(i) of the physical plane PPL0 and the physical block BLK(i) of the physical plane PPL1, which form a pair, is a defective block, the logical block BLK(i) is a defective block, and only when both the physical block BLK(i) of the physical plane PPL0 and the physical block BLK(i) of the physical plane PPL1, which form a pair, are normal blocks, the logical block BLK(i) is constructed as a normal block. It should be noted that i is an integer from 0 to n−1. Assuming the exemplary condition shown in FIG. 8, in the power-on read process, the semiconductor memory device 2 causes a register to store information indicating that the logical blocks BLK(1), BLK(2), BLK(3), and BLK(4) are defective blocks. In addition, the memory controller 1 creates a bad block table using bad block information obtained by accessing the semiconductor memory device 2 and stores the bad block table in the RAM 11 shown in FIG. 1. Accordingly, the memory controller 1 instructs the semiconductor memory device 2 to operate while avoiding the designation of the logical blocks BLK(1), BLK(2), BLK(3), and BLK(4) as the logical block addresses LBAD0. In the setting method of the comparative example, as shown in FIG. 8, the logical block BLK of the logical plane LPL0 can be easily constructed, and for example, the address conversion circuit for converting the logical block address LBAD0 into the physical address PAD0 and the physical address PAD1 can be simplified.

Meanwhile, when the logical plane LPL0 is constructed by such a method, the physical block BLK(1) of the physical plane PPL0 and the physical block BLK(2) of the physical plane PPL1 are not used even though the physical block BLK(1) of the physical plane PPL0 and the physical block BLK(2) of the physical plane PPL1 are normal blocks, which is wasteful. As described above, when the logical block BLK is constructed by the above-described method, although the construction is simple, there is a concern that the number of valid blocks of the semiconductor memory device 2 decreases too much.

Figure 9:
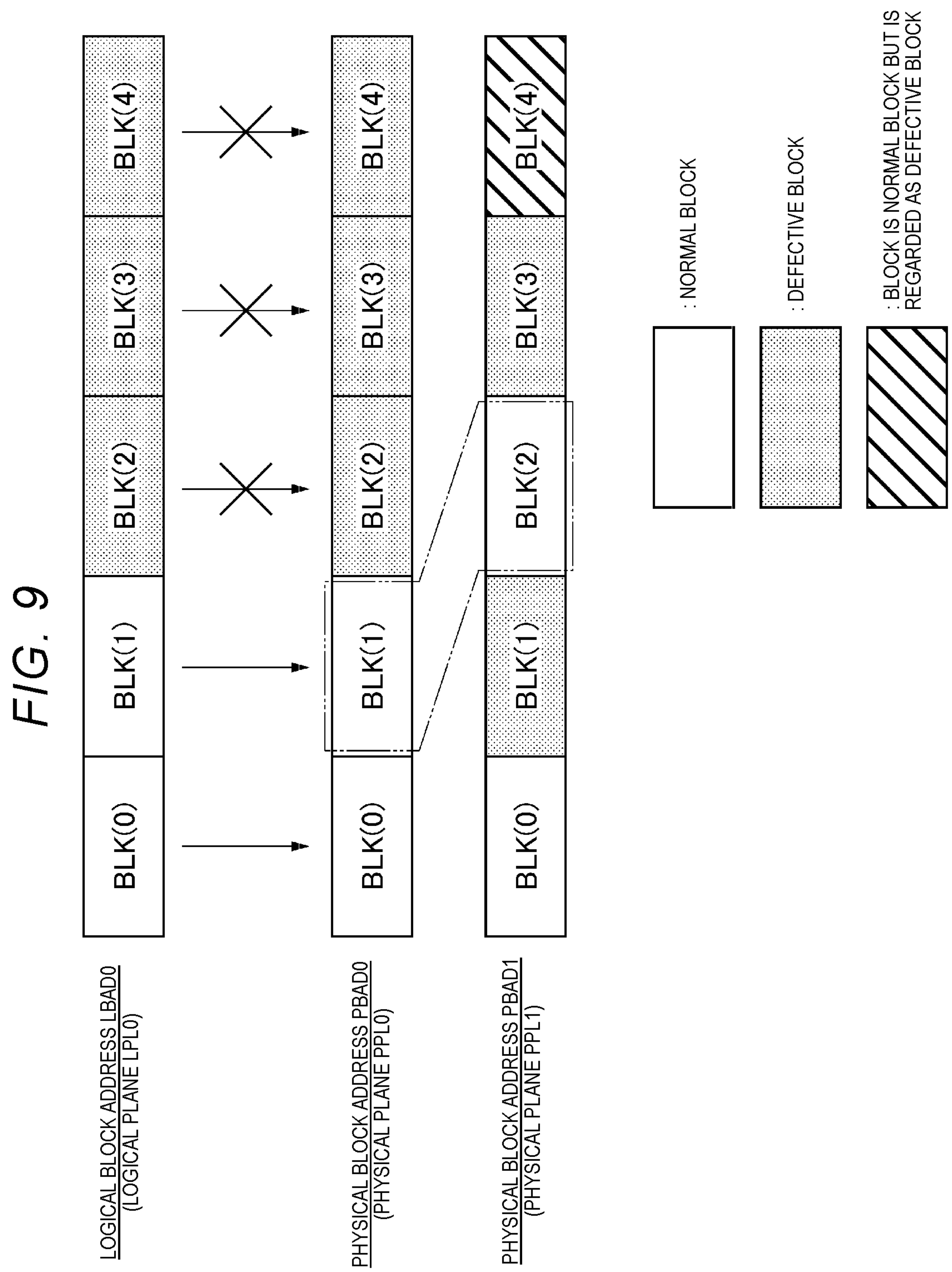
FIG. 9 is a diagram schematically showing a setting example of the logical block address in the embodiment.

Therefore, in the semiconductor memory device 2 according to the present embodiment, as shown in FIG. 9, the logical block BLK(i), which is designated by the logical block address LBAD0, can be constructed with the physical block BLK(i) of the physical plane PPL0, which is one physical plane, and the physical block BLK(j) of the physical plane PPL1, which is the other physical plane. Here, j is an integer from 0 to n−1, and i≠j. For example, in a case of the example shown in FIG. 9, the physical block BLK(1) of the physical plane PPL0 and the physical block BLK(2) of the physical plane PPL1 can be combined to construct one logical block BLK(1). Accordingly, the number of valid blocks of the semiconductor memory device 2 can be increased. Assuming the exemplary condition shown in FIG. 9, in the power-on read process, the semiconductor memory device 2 causes the address register to store information indicating that the logical blocks BLK(2), BLK(3), and BLK(4) are defective blocks. In addition, the memory controller 1 creates a bad block table using bad block information obtained by accessing the semiconductor memory device 2 and stores the bad block table in the RAM 11 shown in FIG. 1. Accordingly, the memory controller 1 instructs the semiconductor memory device 2 to operate while avoiding the designation of the logical blocks BLK(1), BLK(2), BLK(3), and BLK(4) as the logical block addresses LBAD0. Therefore, in the memory system according to the present embodiment, the memory controller 1 can appropriately instruct the semiconductor memory device 2 to operate only by avoiding the designation of the defective block as the logical block address LBAD0 as in a case of the comparative example. Therefore, the load for managing the defective block in the semiconductor memory device 2 by the memory controller 1 does not increase as compared with a case of the comparative example.

Figure 10:
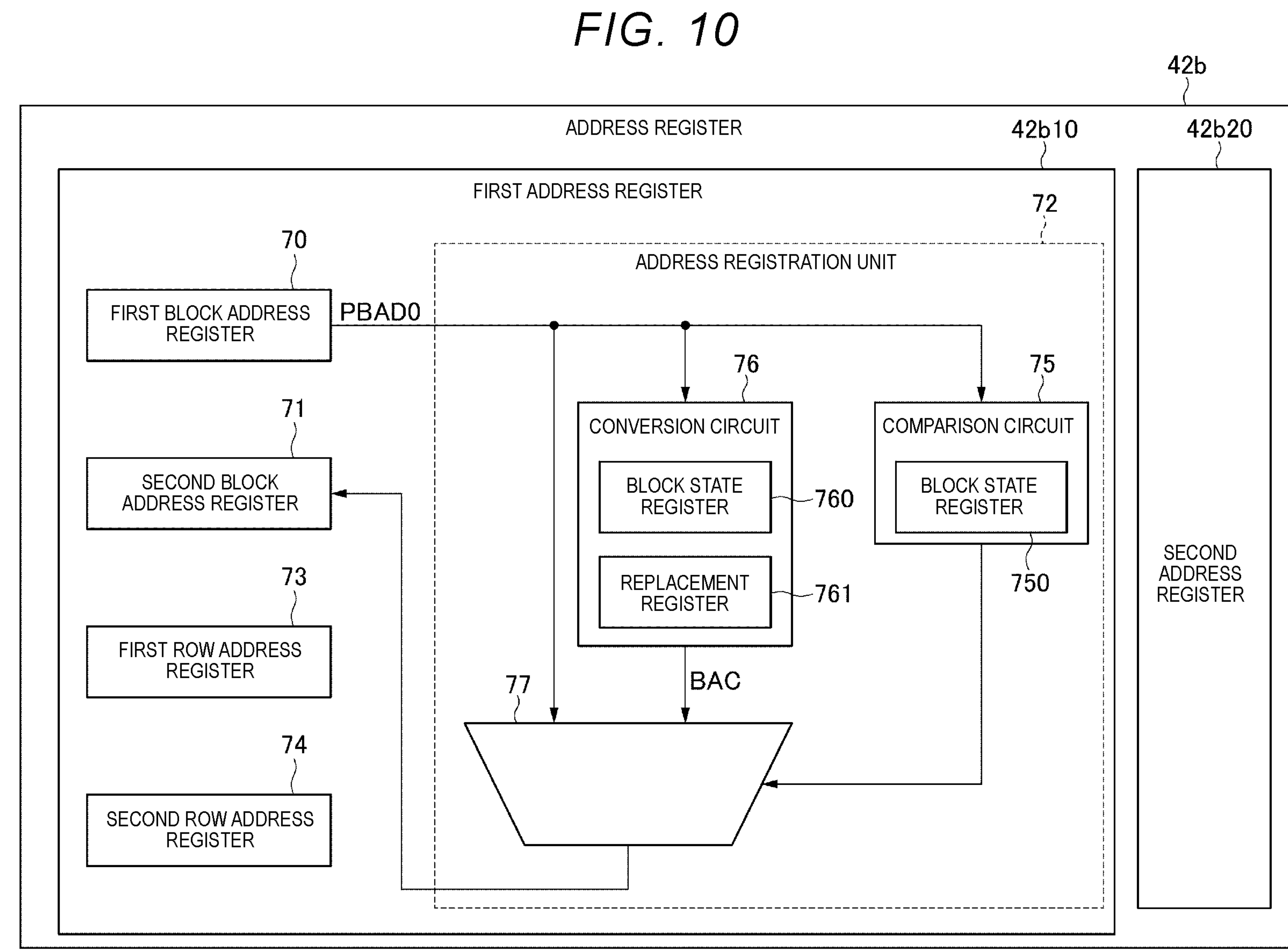
FIG. 10 is a block diagram showing a schematic configuration of an address register in the embodiment.

Next, the configuration of the address register 42*b* according to the present embodiment for achieving the construction of the logical block as described above will be specifically described. FIG. 10 is a block diagram showing the configuration of the address register 42*b*. As shown in FIG. 10, the address register 42*b* includes a first address register 42*b*10 and a second address register 42*b*20. The first address register 42*b*10 is an address register corresponding to the logical plane LPL0, which is one logical plane. The second address register 42*b*20 is an address register corresponding to the logical plane LPL1, which is the other logical plane. Since the configurations and the operations of the first address register 42*b*10 and the second address register 42*b*20 are substantially the same, the configuration and the operation of the first address register 42*b*10 will be described below as representative.

The first address register 42*b*10 includes a first block address register 70, a second block address register 71, an address registration unit 72, a first row address register 73, and a second row address register 74.

The first row address register 73 is for storing the physical row address PRAD0 of the physical plane PPL0. The second row address register 74 is for storing the physical row address PRAD1 of the physical plane PPL1. The logical row address LRAD0 included in the logical address LAD0 of the logical plane LPL0, which is transferred from the input/output circuit 21 to the first address register 42*b*10, is stored as is in each of the row address registers 73 and 74. That is, in the semiconductor memory device 2 according to the present embodiment, the logical row address LRAD0 is used as is, as the physical row address PRAD0 of the physical plane PPL0 and the physical row address PRAD1 of the physical plane PPL1.

The first block address register 70 is for storing the physical block address PBAD0 of the physical plane PPL0. The logical block address LBAD0 included in the logical address LAD0 of the logical plane LPL0, which is transferred from the input/output circuit 21 to the first address register 42*b*10, is directly stored in the first block address register 70. That is, in the semiconductor memory device 2 according to the present embodiment, the logical block address LBAD0 is used as is, as the physical block address PBAD0 of the physical plane PPL0.

It should be noted that the processor 12 of the memory controller 1 shown in FIG. 1 acquires information on the normality and defectiveness of each physical block BLK provided in the memory cell array 110 of the physical plane PPL0 by accessing the semiconductor memory device 2 after the execution of the power-on read process. When the processor 12 instructs the semiconductor memory device 2 to operate, the processor 12 avoids the designation of the logical block address LBAD0 corresponding to the address of the physical block BLK determined to be defective among the physical blocks BLK provided in the memory cell array 110 of the physical plane PPL0, and designates only the logical block address LBAD0 corresponding to the address of the physical block BLK determined to be normal. For example, when each of the physical blocks BLK of the physical planes PPL0 and PPL1 is in the state as shown in FIG. 9, the processor 12 may transmit the block BLK(0) or BLK(1) to the semiconductor memory device 2 as the logical block addresses LBAD0, but does not transmit the block BLK(2) or BLK(3) to the semiconductor memory device 2.

The second block address register 71 shown in FIG. 10 is for storing the physical block address PBAD1 of the physical plane PPL1. The block address set by the address registration unit 72 is stored in the second block address register 71 as the physical address PAD1.

The address registration unit 72 is a section that sets the physical block address PBAD1 of the physical plane PPL1 based on the physical block address PBAD0 stored in the first block address register 70. The address registration unit 72 includes a comparison circuit 75, a conversion circuit 76, and a multiplexer 77.

The comparison circuit 75 has a block state register 750. The comparison circuit 75 compares the physical block address stored in the block state register 750 with the physical block address PBAD0 stored in the first block address register 70, and outputs a signal indicating whether the physical block addresses match each other.

The block state register 750 stores one or a plurality of addresses, each of which is an address that corresponds to a normal physical block among the physical blocks BLK provided in the memory cell array 110 of the physical plane PPL0 and a defective physical block among the physical blocks BLK provided in the memory cell array 210 of the physical plane PPL1. Specifically, the sequencer 41 shown in FIG. 2 transfers and stores the state information on the physical planes PPL0 and PPL1 acquired from the ROM blocks of the memory cell arrays 110 and 210 of the physical planes PPL0 and PPL1, respectively, specifically, the address corresponding to the physical block determined as a normal block in the memory cell array 110 of the physical plane PPL0 and determined as a defective block in the memory cell array 210 of the physical plane PPL1, in the block state register 750 during the power-on read process.

For example, when each of the physical blocks BLK of the physical planes PPL0 and PPL1 is in the state as shown in FIG. 9, since the physical block BLK(1) of the physical plane PPL0 is a normal block and the physical block BLK(1) of the physical plane PPL1 is a defective block, the sequencer 41 transfers and stores the addresses of the blocks BLK(1) corresponding to the physical block BLK(1) of the physical plane PPL0 and the physical block BLK(1) of the physical plane PPL1, in the block state register 750.

The comparison circuit 75 shown in FIG. 10 reads the physical block address PBAD0 stored in the first block address register 70, compares the read physical block address PBAD0 with the address stored in the block state register 750, and determines whether the physical block address PBAD0 and the address match each other.

For example, when each of the physical blocks BLK of the physical planes PPL0 and PPL1 is in the state as shown in FIG. 9, since the physical block BLK(0) of the physical plane PPL1 is a normal block, the address of the block BLK(0) is not stored in the block state register 750. Therefore, when the address of the block BLK(0) is stored in the first block address register 70 as the address of the physical block address PBAD0, the comparison circuit 75 determines that the physical block address PBAD0 stored in the first block address register 70 and the address stored in the block state register 750 do not match each other, and transfers a determination result to the multiplexer 77.

On the other hand, the physical block BLK(1) of the physical plane PPL0 is a normal block, and the physical block BLK(1) of the physical plane PPL1 is a defective block. Therefore, the address of the block BLK(1) is stored in the block state register 750. Therefore, when the address of the block BLK(1) is stored in the first block address register 70 as the address of the physical block address PBAD0, the comparison circuit 75 determines that the physical block address PBAD0 stored in the first block address register 70 and the address stored in the block state register 750 match each other, and transfers a determination result to the multiplexer 77.

The conversion circuit 76 includes a block state register 760 and a replacement register 761.

The block state register 760 stores the same information as the block state register 750 of the comparison circuit 75, that is, the address corresponding to the physical block determined as a normal block in the memory cell array 110 of the physical plane PPL0 and determined as a defective block in the memory cell array 210 of the physical plane PPL1. The address stored in the block state register 760 may be information registered by the sequencer 41 during the power-on read process, or may be information copied from the address registered in the block state register 750 of the comparison circuit 75.

The replacement register 761 stores one or a plurality of addresses, each of which is an address corresponding to a defective physical block in the physical plane PPL0 and a normal physical block in the physical plane PPL1. For example, when the physical blocks BLK of the physical planes PPL0 and PPL1 are in the state as shown in FIG. 9, the address of the block BLK(2) and the address of the block BLK(4) are stored in the replacement register 761. The address stored in the replacement register 761 is registered by the sequencer 41 during the power-on read process.

The conversion circuit 76 compares the physical block address PBAD0 stored in the first block address register 70 with the address stored in the block state register 760, and determines whether the physical block address PBAD0 and the address stored in the block state register 760 match each other. When it is determined that the physical block address PBAD0 and the address stored in the block state register 760 match each other, the conversion circuit 76 converts the physical block address PBAD0 into the address of the block BLK stored in the replacement register 761, and transmits the converted physical block address BAC to the multiplexer 77.

For example, when each of the physical blocks BLK of the physical planes PPL0 and PPL1 is in the state as shown in FIG. 9, the physical block BLK(1) of the physical plane PPL0 is a normal block, and the physical block BLK(1) of the physical plane PPL1 is a defective block. Therefore, the address of the block BLK(1) is stored in the block state register 750. Therefore, when the first block address register 70 stores the address of the block BLK(1) as the physical block address PBAD0, the conversion circuit 76 determines that the physical block address PBAD0 stored in the first block address register 70 and the address stored in the block state register 760 match each other, replaces the physical block address PBAD0 with the address stored in the replacement register 761, for example, the address of the block BLK(2), and transmits the address stored in the replacement register 761 to the multiplexer 77.

It should be noted that the address of each block BLK stored in the block state register 760 of the conversion circuit 76 is correlated with the address of each block stored in the replacement register 761 in a one-to-one manner. For example, it is assumed that the address of the block BLK(a1) and the address of the block BLK(a2) are stored in the block state register 760, and the address of the block BLK(b1) and the address of the block BLK(b2) are stored in the replacement register 761. It should be noted that a1, a2, b1, and b2 are predetermined integers. In this case, the address of the block BLK(a1) is correlated with the address of the block BLK(b1), and the address of the block BLK(a2) is correlated with the address of the block BLK(b2).

It is desirable that the number of addresses of the block BLK stored in the block state register 760 and the number of addresses of the block BLK stored in the replacement register 761 match each other. As a result, since the address of the block BLK to be replaced in the physical plane PPL0 and the address of the block BLK that can be replaced in the physical plane PPL1 can be correlated with each other in a one-to-one manner, the circuit configuration of the address register 42*b* can be simplified. It should be noted that, when the numbers of defective blocks of the physical planes PPL0 and PPL1 do not match each other, the addresses, which are an address of a normal block in one physical plane and an address of a defective block in the other physical plane, which may be as many as the number of the difference therebetween, are regarded as defective blocks. As a result, the number of defective blocks in the physical plane PPL0 and the number of defective blocks in the physical plane PPL1 may be made to match each other. For example, when the physical block BLK of each of the physical planes PPL0 and PPL1 is in the state as shown in FIG. 9, the sequencer 41 regards the physical block BLK(4) of the physical plane PPL1 as a defective block. As a result, the number of defective blocks in the physical plane PPL0 and the number of defective blocks in the physical plane PPL1 can be made to match each other, the circuit configuration of the address register 42*b* can be simplified, and the reliability of the operation can be improved.

In addition, when the physical address PAD0 stored in the first block address register 70 and the address stored in the block state register 760 do not match each other, the conversion circuit 76 transmits, for example, the physical address PAD0 as is to the multiplexer 77.

The multiplexer 77 reads the physical block address PBAD0 stored in the first block address register 70 and the physical block address BAC converted by the conversion circuit 76, and transfers and stores one of the physical block address PBAD0 and the converted physical block address BAC in the second block address register 71, based on the output signal of the comparison circuit 75.

Specifically, when the signal output from the comparison circuit 75 is a signal indicating that the physical block address PBAD0 stored in the first block address register 70 and the address stored in the block state register 750 do not match each other, the multiplexer 77 transfers and registers the physical block address PBAD0 stored in the first block address register 70 as is into the second block address register 71. That is, when the physical block BLK of the physical plane PPL1 corresponding to the physical block address PBAD0 is a normal block, the multiplexer 77 registers the physical block address PBAD0 as is into the second block address register 71.

On the other hand, when the signal output from the comparison circuit 75 is a signal indicating that the physical block address PBAD0 stored in the first block address register 70 and the address stored in the block state register 750 match each other, the multiplexer 77 transfers and registers the physical block address BAC converted by the conversion circuit 76 into the second block address register 71. That is, when the physical block BLK of the physical plane PPL1 corresponding to the physical block address PBAD0 is a defective block, the multiplexer 77 registers an address, which is an address of a defective physical block in the physical plane PPL0 and is an address of a normal physical block in the physical plane PPL1, into the second block address register 71.

1.6 Operation Example of Semiconductor Memory Device

Next, an operation example of the semiconductor memory device 2 according to the present embodiment will be described with reference to FIGS. 11, 12A, and 12B.

Figure 11:
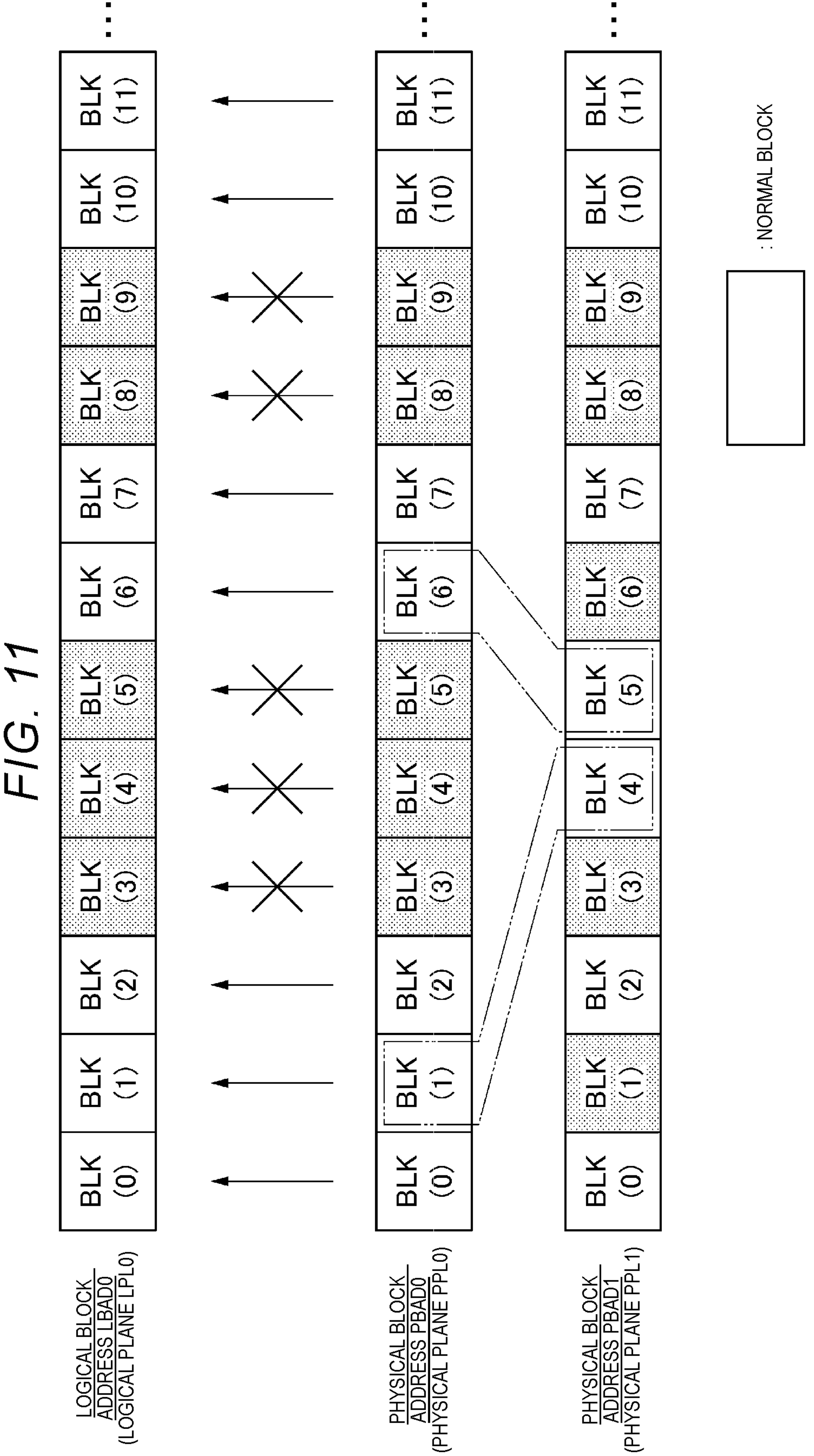
FIG. 11 is a diagram schematically showing a setting example of the logical block address in the semiconductor memory device according to the embodiment.
Figure 12A:
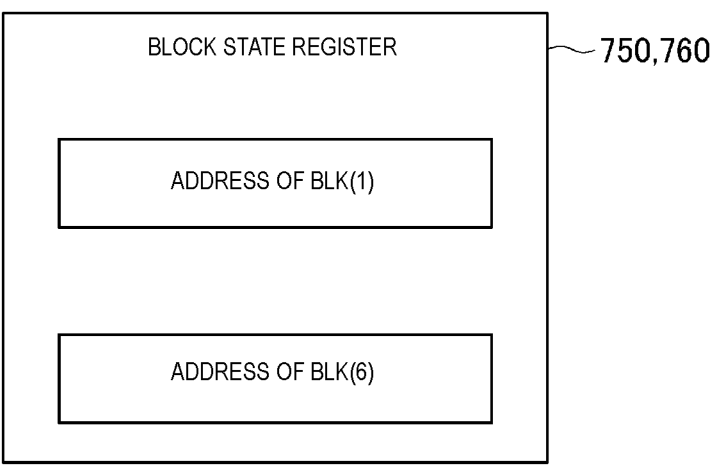
FIGS. 12A and 12B are diagrams schematically showing examples of information stored in a block state register and a replacement register in the embodiment.
Figure 12B:
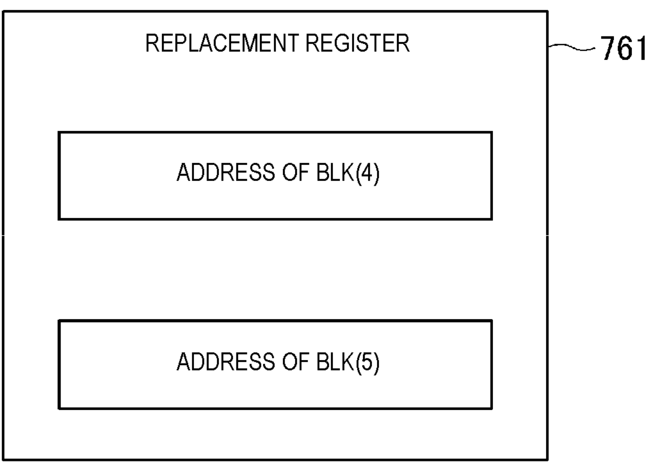

For example, it is assumed that the physical blocks BLK(0) to BLK(11) of the physical plane PPL0 and the physical blocks BLK(0) to BLK(11) of the physical plane PPL1 are in the states as shown in FIG. 11. It should be noted that, in FIG. 11, normal blocks are shown in white, and defective blocks are hatched with dots. That is, in the example shown in FIG. 11, in the physical plane PPL0, the physical blocks BLK(0) to BLK(2), BLK(6), BLK(7), BLK (10), and BLK(11) are normal blocks (non-defective blocks), and the physical blocks BLK(3) to BLK(5), BLK (8), and BLK(9) are defective blocks (defective blocks). In addition, in the physical plane PPL1, the physical blocks BLK(0), BLK(2), BLK(4), BLK(5), BLK(7), BLK(10), and BLK(11) are normal blocks (non-defective blocks), and the physical blocks BLK(1), BLK(3), BLK(6), BLK(8), and BLK(9) are defective blocks (defective blocks).

When the physical blocks BLK(0) to BLK(11) of the physical plane PPL0 and the physical blocks BLK(0) to BLK(11) of the physical plane PPL1 are in the states as shown in FIG. 11, the addresses of the normal blocks in the physical plane PPL0 and the defective physical blocks BLK(1) and BLK(6) in the physical plane PPL1 are stored in the block state registers 750 and 760. Therefore, the block state registers 750 and 760 store the information as shown in FIG. 12A.

In addition, the replacement register 761 stores an address, which is an address of a defective physical block in the physical plane PPL0 and is an address of a normal physical block in the physical plane PPL1. Therefore, the replacement register 761 stores the information as shown in FIG. 12B.

Meanwhile, it is assumed that the memory controller 1 transmits the signal DQ<7:0> including the command and the logical address LAD0 of the logical plane LPL0 to the semiconductor memory device 2 in order to cause the semiconductor memory device 2 to perform the read operation, the write operation, and the erasing operation. In this case, the memory controller 1 transmits the logical block address LBAD0 corresponding to the address of the normal physical block in the physical plane PPL0 to the semiconductor memory device 2. Specifically, the memory controller 1 transmits the addresses of the blocks BLK(0) to BLK(2), BLK(6), BLK(7), BLK(10), and BLK(11) as the logical block addresses LBAD0 to the semiconductor memory device 2.

For example, when the memory controller 1 transmits the address of the block BLK(0) as the logical block address LBAD0 to the semiconductor memory device 2, the address of the block BLK(0) is stored in the first block address register 70. In this case, as shown in FIG. 11, since the physical block BLK(0) of the second physical plane PPL1 corresponding to the block BLK(0) is a normal physical block, the address of the block BLK(0) is transferred to the second block address register 71 and stored. As a result, the logical block BLK(0) of the logical plane LPL0 is constructed as a normal logical block by the physical block BLK(0) of the physical plane PPL0 and the physical block BLK(0) of the physical plane PPL1.

Subsequently, when the memory controller 1 transmits the address of the block BLK(1) as the logical block address LBAD0 to the semiconductor memory device 2, the address of the block BLK(1) is stored in the first block address register 70. In this case, since the address of the block BLK(1) is stored in the block state registers 750 and 760 shown in FIG. 12A, the address of the block BLK(1) is replaced with the address of the block BLK(4) registered in the replacement register 761 shown in FIG. 12B. As a result, as indicated by a two-dot chain line in FIG. 11, the logical block BLK(1) of the logical plane LPL0 is constructed, as a normal logical block, by the physical block BLK(1) of the physical plane PPL0 and the physical block BLK(4) of the physical plane PPL1.

Subsequently, when the memory controller 1 transmits the address of the block BLK(2) as the logical block address LBAD0 to the semiconductor memory device 2, the address of the block BLK(2) is stored in the first block address register 70. In this case, as shown in FIG. 11, since the physical block BLK(2) of the second physical plane PPL1 corresponding to the block BLK(2) is a normal physical block, the address of the block BLK(2) is transferred to the second block address register 71 and stored. As a result, the logical block BLK(2) of the logical plane LPL0 is constructed as a normal logical block by the physical block BLK(2) of the physical plane PPL0 and the physical block BLK(2) of the physical plane PPL1.

Subsequently, when the memory controller 1 transmits the address of the block BLK(6) as the logical block address LBAD0 to the semiconductor memory device 2, the address of the block BLK(6) is stored in the first block address register 70. In this case, since the address of the block BLK(6) is stored in the block state registers 750 and 760 shown in FIG. 12A, the address of the block BLK(6) is replaced with the address of the block BLK(5) registered in the replacement register 761 shown in FIG. 12B. As a result, as indicated by a two-dot chain line in FIG. 11, the logical block BLK(6) of the logical plane LPL0 is constructed, as a normal logical block, by the physical block BLK(6) of the physical plane PPL0 and the physical block BLK(5) of the physical plane PPL1.

Next, a flow of the operation of the semiconductor memory device 2 according to the present embodiment will be described with reference to FIG. 13.

Figure 13:
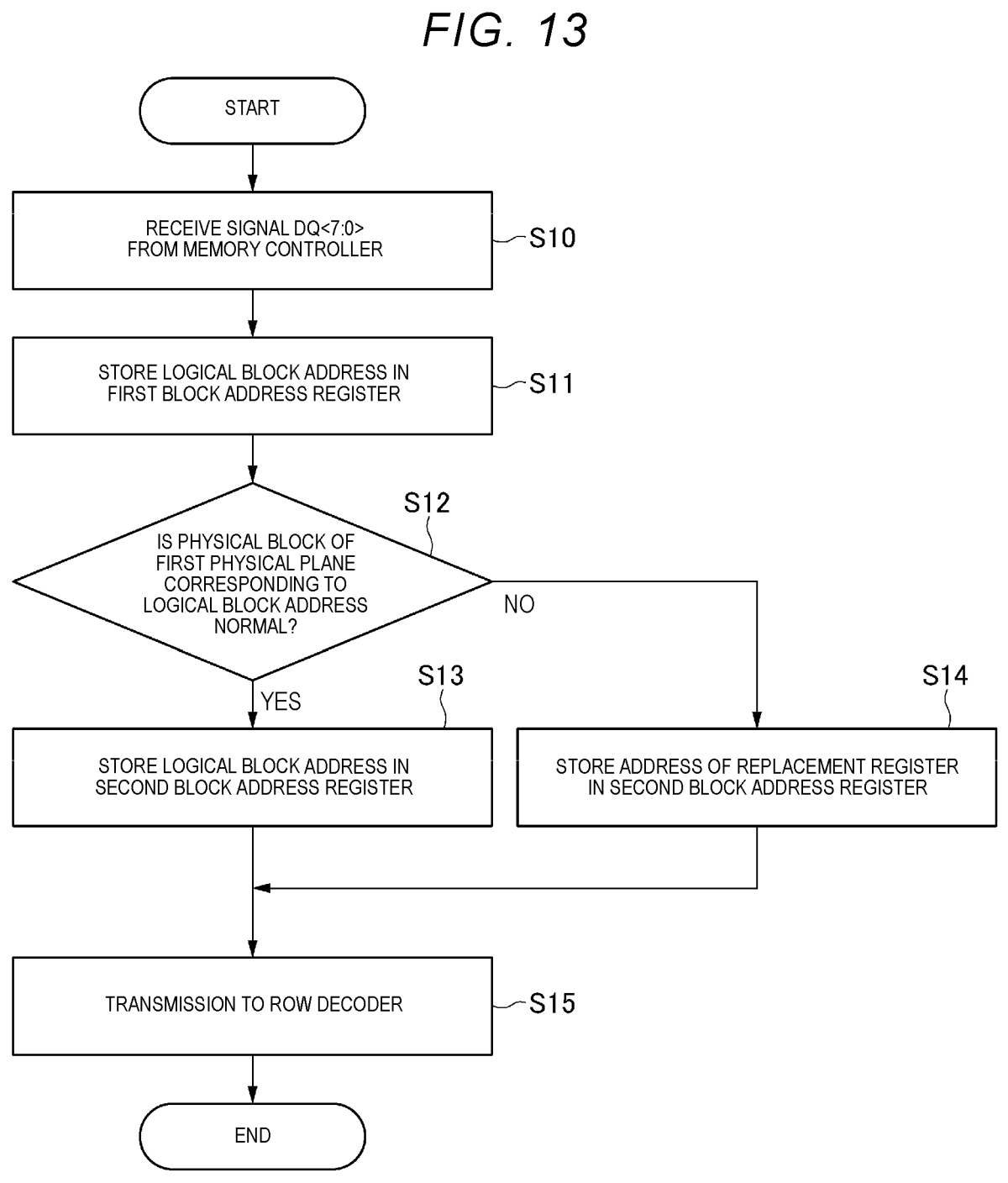

As shown in FIG. 13, in the semiconductor memory device 2 according to the present embodiment, when the signal DQ<7:0> transmitted from the memory controller 1 is received by the input/output circuit 21 (step S10), the logical block address LBAD0 of the logical plane LPL0 included in the signal DQ<7:0> is stored in the first block address register 70 as the physical block address PBAD0 of the physical plane PPL0 (step S11).

Subsequently, in the semiconductor memory device 2, when the physical block of the physical plane PPL1 corresponding to the logical block address LBAD0 is a normal physical block (step S12: YES), the same address as the physical block address PBAD0 of the physical plane PPL0, that is, the logical block address LBAD0 of the logical plane LPL0 is stored in the second block address register 71 as the physical block address PBAD1 of the physical plane PPL1 (step S13).

On the other hand, in the semiconductor memory device 2, when the physical block of the physical plane PPL1 corresponding to the logical block address LBAD0 is a defective physical block (step S12: NO), the address stored in the replacement register 761 is stored in the second block address register 71 as the physical block address PBAD1 of the physical plane PPL1 (step S14). That is, the second block address register 71 stores an address, which is an address of a defective physical block in the physical plane PPL0 and is an address of a normal physical block in the physical plane PPL1.

In the semiconductor memory device 2, after the process of step S12 or step S13 is executed, the physical block address PBAD0 and the physical block address PBAD1 stored respectively in the first block address register 70 and the second block address register 71 are transmitted respectively to the row decoders 130 and 230 (step S15), and the memory cell arrays 110 and 210 are read or written.

It should be noted that, as described above, the memory controller 1 acquires the information on the normal and defective physical blocks BLK provided in the memory cell array 110 of the physical plane PPL0 from the semiconductor memory device 2 by accessing the semiconductor memory device 2 after the power-on read process. Therefore, the same address as the block address PBAD0 corresponding to the defective physical block in the physical plane PPL0 can be avoided from being designated as the logical block address LBAD0 by the memory controller 1. The semiconductor memory device 2 may be configured not to execute the operation when the same address as the block address PBAD0 corresponding to the defective physical block in the physical plane PPL0 is designated as the logical block address LBAD0 when the operation is instructed by the memory controller 1.

1.7 Effects

The semiconductor memory device 2 according to the present embodiment includes the first block address register 70, the second block address register 71, the replacement register 761, the address registration unit 72, and the sequencer 41. The first block address register 70 stores the physical block address PBAD0, which is the address of the physical block BLK of the physical plane PPL0, as a first register. The second block address register 71 stores the physical block address PBAD1, which is the address of the physical block BLK of the physical plane PPL1, as a second register correlated with the first register. The replacement register 761 stores an address, which is an address of a defective physical block in the physical plane PPL0 and an address of a normal physical block in the physical plane PPL1, as a third register. When the physical block BLK of the physical plane PPL1 corresponding to the physical block address PBAD0 is a defective block, the address registration unit 72 registers the address stored in the replacement register 761 as the physical block address PBAD1 into the second block address register 71, as a first address registration unit. The sequencer 41 registers, as a second address registration unit, an address, which is an address of a defective physical block in the physical plane PPL0 and is an address of a normal physical block in the physical plane PPL1, into the replacement register 761 during the power-on read process executed after a power is turned on.

For example, as shown in FIG. 11, when the physical block BLK(1) of the physical plane PPL0 is a normal block and the physical block BLK(1) of the physical plane PPL1, which is paired with the physical block BLK(1) of the physical plane PPL0, is a defective block, when the physical block BLK(1) of the physical plane PPL0 and the physical block BLK(1) of the physical plane PPL1 are simply combined to be the logical block BLK(1) of the logical plane LPL0 as in the comparative example, the constructed logical block BLK(1) is a defective block (defective block). Similarly, when the physical block BLK(4) of the physical plane PPL0 is a defective block and the physical block BLK(4) of the physical plane PPL1, which is paired with the physical block BLK(4) of the physical plane PPL0, is a normal block, when the physical block BLK(4) of the physical plane PPL0 and the physical block BLK(4) of the physical plane PPL1 are combined to be the logical block BLK(4) of the logical plane LPL0 as in the comparative example, the constructed logical block BLK(4) is a defective block (defective block). On the other hand, in the present embodiment, the physical block BLK(1) of the normal physical plane PPL0 and the physical block BLK(4) of the normal physical plane PPL1 can be combined to construct the logical block BLK(1) of the logical plane LPL0. As a result, the number of valid blocks can be increased without increasing the load for managing the defective block in the semiconductor memory device 2 by the memory controller 1 as compared with a case of the comparative example.

It should be noted that, in such a semiconductor memory device 2, in the ROM block provided in each of the memory cell arrays 110, 210, 310, and 410, the information on the normality and defectiveness of each physical block BLK recognized at the time of factory shipment is stored in an initial state. However, since the semiconductor memory device 2 is continuously used and the memory cell arrays 110, 210, 310, and 410 deteriorate with time, the physical blocks BLK of the memory cell arrays 110, 210, 310, and 410 may transition from a normal state to a defective state afterwards. When such an acquired defective block is detected afterwards through a specific sequence check executed by the sequencer 41, the sequencer 41 stores the address of the acquired defective block in the ROM block of each of the memory cell arrays 110, 210, 310, and 410. With the semiconductor memory device 2 according to the present embodiment, the sequencer 41 updates the address registered in the replacement register 761 based on the information registered in the ROM block of each of the memory cell arrays 110, 210, 310, and 410 during the power-on read process. Therefore, even when the acquired defective block is generated, the operation as the semiconductor memory device 2 can be secured, and thus the reliability can be improved.

The address register 42*b* according to the present embodiment stores an address, which is an address of a defective block in the physical plane PPL1 and is an address of a normal block in the physical plane PPL0, as the physical block address PBAD0 of the physical plane PPL0.

The address of such a block is, for example, the address of the physical block BLK(1) of the physical plane PPL0 shown in FIG. 11. In the present embodiment, since the physical block BLK(1) of the physical plane PPL0 is used as the logical block BLK(1) of the logical plane LPL0, the number of valid blocks can be more efficiently improved.

The address registration unit 72 reads the physical block address PBAD0 stored in the first block address register 70, and when the physical block BLK of the physical plane PPL1 corresponding to the physical block address PBAD0 is a normal block, the address registration unit 72 registers the physical block address PBAD0 as is into the second block address register 71 as the physical block address PBAD1. In addition, when the physical block BLK of the physical plane PPL1 corresponding to the physical block address PBAD0 is a defective block, the address registration unit 72 converts the physical block address PBAD0 into an address, which is an address of a defective block in the physical plane PPL0 and is an address of a normal block in the physical plane PPL1, and registers the converted physical block address BAC as the physical block address PBAD1 into the second block address register 71.

With this configuration, when the physical block BLK of the physical plane PPL1 corresponding to the address of the physical block BLK of the physical plane PPL0 is a normal physical block, the logical block BLK of the logical plane LPL0 can be constructed with the combination thereof. In addition, when the physical block BLK of the physical plane PPL1 corresponding to the address of the physical block BLK of the physical plane PPL0 is a defective physical block, the logical block BLK of the logical plane LPL0 can be constructed by combining the physical block BLK of the physical plane PPL0 and the physical block BLK of the physical plane PPL1 corresponding to the physical block address BAC.

The address registration unit 72 includes the block state register 750 and 760, the comparison circuit 75, the conversion circuit 76, and the multiplexer 77. The block state registers 750 and 760 store the address of the normal physical block BLK in the physical plane PPL0 and the address of the defective physical block BLK in the physical plane PPL1, as fourth registers. The comparison circuit 75 reads the physical block address PBAD0 stored in the first block address register 70, compares the read physical block address PBAD0 with the address stored in the block state register 750, and outputs a signal indicating whether the physical block address PBAD0 and the address stored in the block state register 750 match each other. The conversion circuit 76 reads the physical block address PBAD0 stored in the first block address register 70, and when the read physical block address PBAD0 and the address stored in the block state register 760 match each other, the conversion circuit 76 converts the physical block address PBAD0 into the address stored in the replacement register 761. When the signal output from the comparison circuit 75 is a signal indicating that the physical block address PBAD0 stored in the first block address register 70 and the address stored in the block state register 750 do not match each other, the multiplexer 77 registers the physical block address PBAD0 into the second block address register 71. When the signal output from the comparison circuit 75 is a signal indicating that the physical block address PBAD0 stored in the first block address register 70 and the address stored in the block state register 750 match each other, the multiplexer 77 registers the physical block address BAC converted by the conversion circuit 76 into the second block address register 71.

With this configuration, the above-described configuration of the address registration unit 72 can be easily achieved.

The sequencer 41 registers the address of the normal physical block BLK in the physical plane PPL0, which is the defective physical block BLK in the physical plane PPL1, into the block state registers 750 and 760, and registers an address, which is an address of a defective physical block in the physical plane PPL0 and is an address of a normal physical block in the physical plane PPL1, into the replacement register 761, during the power-on read process.

In the address register 42*b*, there is a concern that the addresses registered in the block state registers 750 and 760 and the replacement register 761 may be erased each time the power supplied to the semiconductor memory device 2 is shut down. In this respect, with the above-described configuration, when the power of the memory system is turned on, the addresses registered in the block state registers 750 and 760 and the replacement register 761 can be restored. Therefore, the above-described concern can be eliminated.

2. Other Embodiments

The present disclosure is not limited to the above-described specific examples.

For example, the number of physical planes provided in the semiconductor memory device 2 is not limited to four as in the present embodiment, and may be changed as appropriate.

For example, the number of physical planes provided in each of the logical planes LPL0 and LPL1 is not limited to two as in the present embodiment, and may be three or more. The number of logical planes is not limited to two as in the present embodiment, and may be one or three or more.

Figure 14:
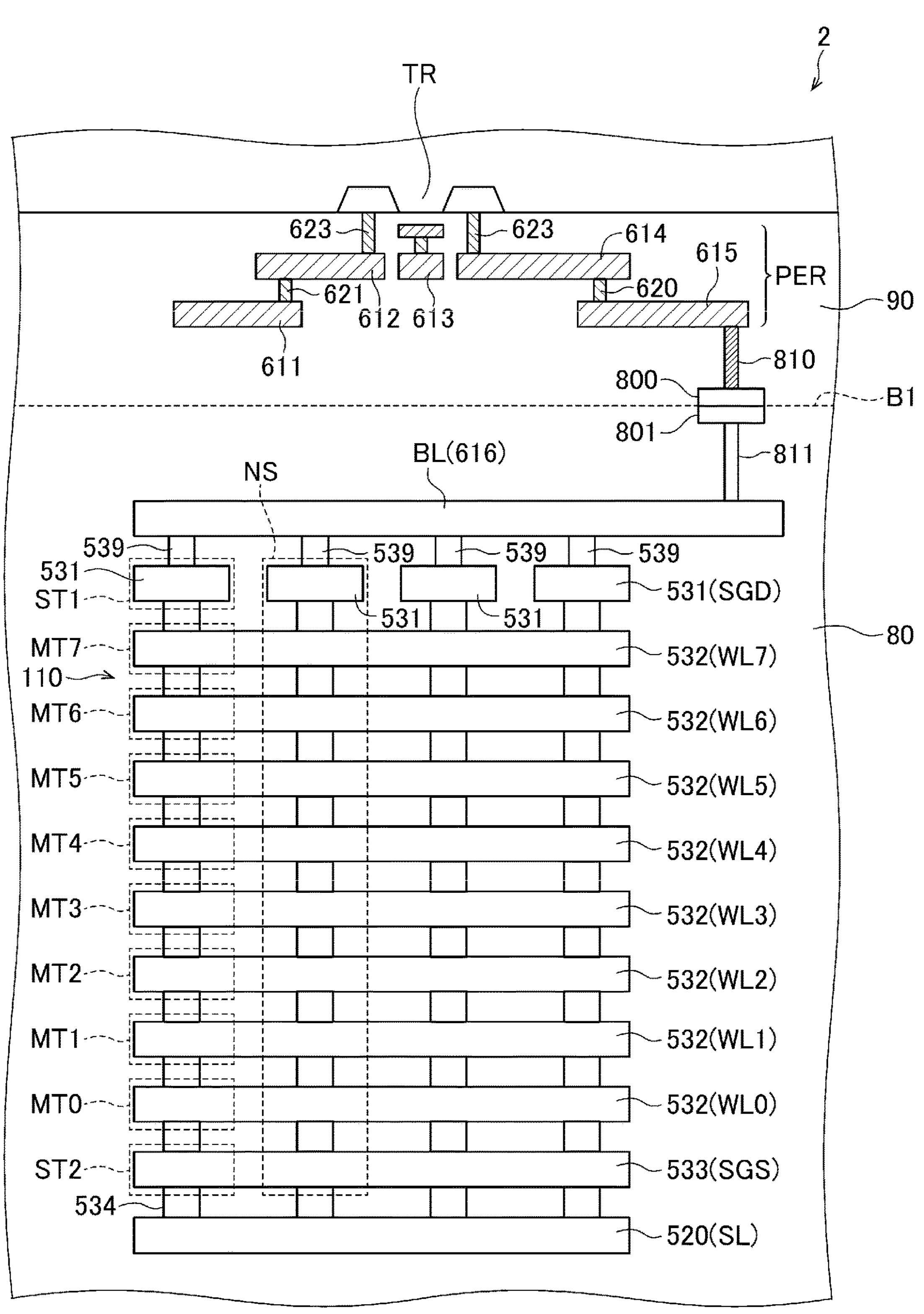
FIG. 14 is a cross-sectional view showing a cross-sectional structure of a semiconductor memory device according to another embodiment.

The structure of the semiconductor memory device 2 is not limited to the structure shown in FIG. 6, and may be appropriately changed. For example, the semiconductor memory device 2 may have a CMOS bonding array (CBA) structure as shown in FIG. 14. In the semiconductor memory device 2 shown in FIG. 14, a memory unit 80 in which the memory cell array 110 is provided, and a control circuit unit 90 in which the peripheral circuit PER is provided are manufactured separately. The semiconductor memory device 2 is formed by bonding the memory unit 80 and the control circuit unit 90, which are separately manufactured, to each other at a bonding surface B1. The memory cell array 110 and the peripheral circuit PER are electrically connected to each other via the wiring layers 800 and 801 and vias 810 and 811 provided on the bonding surface B1.

The circuit configuration for achieving the address registration unit 72 shown in FIG. 10 may be provided separately from the address register 42*b*.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor memory device having first and second physical planes each including a plurality of physical blocks of memory cells, the semiconductor memory device comprising:

a first register in which a first physical block address is to be stored;

a second register in which a second physical block address associated with the first physical block address is to be stored;

a third register in which one or more third physical block addresses are to be stored; and an address registration unit including a first circuit configured to compare the first physical block address stored in the first register with the third physical block addresses stored in the third register and store the first physical block address in the second register as the second physical block address if the first physical block address does not match any of the third physical block addresses, and a second circuit configured to convert the first physical block address into another physical block address that is stored in the second register as the second physical block address when the first physical block address matches one of the third physical block addresses.

2. The semiconductor memory device according to claim 1, wherein the first physical block address stored in the first register and the second physical block address stored in the second register are two physical block addresses associated with one logical block address that is received by the semiconductor memory device from an external controller.

3. The semiconductor memory device according to claim 2, wherein the logical block address and the first physical block address are identical.

4. The semiconductor memory device according to claim 1, wherein the first circuit includes a comparison circuit configured to compare the first physical block address stored in the first register with the third physical block addresses stored in the third register and a multiplexer circuit configured to output the first physical block address stored in the first register for storage in the second register as the second physical block address or output said another physical block address from the second circuit for storage in the second register as the second physical block address depending on whether or not the first physical block address matches any of the third physical block addresses.

5. The semiconductor memory device according to claim 4, further comprising:

a fourth register in which one or more fourth physical block addresses are to be stored, wherein said another physical block address is one of the fourth physical block addresses.

6. The semiconductor memory device according to claim 5, wherein the third register is populated with the one or more third physical block addresses and the fourth register is populated with the one or more fourth physical block addresses during a power-on process that is carried out when the semiconductor memory device is powered on.

7. The semiconductor memory device according to claim 6, wherein one of the physical blocks of each physical plane stores information about which of the physical blocks thereof are defective.

8. The semiconductor memory device according to claim 7, wherein the physical blocks of the first physical plane and the physical blocks of the second physical plane are identified by the same set of physical block addresses.

9. The semiconductor memory device according to claim 8, wherein each of the third physical block addresses corresponds to a physical address of a physical block of the first physical plane that is not defective and a physical block of the second physical plane that is defective, and each of the fourth physical block addresses corresponds to a physical address of a physical block of the first physical plane that is defective and a physical block of the second physical plane that is not defective.

10. A memory system comprising:

a semiconductor memory device of claim 1; and a controller configured to issue a read request or a write request that specifies a logical block address, wherein the logical block address is correlated with a physical block address of the first physical plane and a physical block address of the second physical plane.

11. A control method for a semiconductor memory device having first and second physical planes each including a plurality of physical blocks of memory cells, a first register in which a first physical block address is to be stored, and a second register in which a second physical block address associated with the first physical block address is to be stored, said method comprising:

storing a logical block address as the first physical block address in the first register;

comparing the first physical block address stored in the first register with third physical block addresses associated with defective physical blocks in the second physical plane; and storing in the second register, the first physical block address as the second physical block address or one of a plurality of fourth physical block addresses associated with defective physical blocks in the first physical plane as the second physical block address, depending on whether or not the first physical block address matches any of the third physical block addresses.

12. The method according to claim 11, further comprising:

when the semiconductor memory device is powered-on, reading one of the physical blocks of the first physical plane and one of the physical blocks of the second physical plane to determine which of the physical blocks are defective, and storing the third physical block addresses in a third register and storing the fourth physical block addresses in a fourth register.

13. The method according to claim 12, further comprising:

notifying an external controller connected to the semiconductor memory device as to which of the physical blocks are defective.

14. The method according to claim 11, wherein the first physical block address stored in the first register and the second physical block address stored in the second register are two physical block addresses associated with one logical block address that is received by the semiconductor memory device from an external controller connected to the semiconductor memory device.

15. The method according to claim 11, wherein the physical blocks of the first physical plane and the physical blocks of the second physical plane are identified by the same set of physical block addresses.

16. The method according to claim 15, wherein each of the third physical block addresses corresponds to a physical address of a physical block of the first physical plane that is not defective and a physical block of the second physical plane that is defective, and each of the fourth physical block addresses corresponds to a physical address of a physical block of the first physical plane that is defective and a physical block of the second physical plane that is not defective.

17. The method according to claim 11, wherein the first physical block address is stored in the second register as the second physical block address if the first physical block address does not match any of the third physical block addresses.

18. The method according to claim 11, wherein one of the fourth physical block addresses is stored in the second register as the second physical block address if the first physical block address matches one of the third physical block addresses.

* * * * *